(12) United States Patent
Hanada

(10) Patent No.: US 10,642,484 B1
(45) Date of Patent: May 5, 2020

(54) DISPLAY DEVICE

(71) Applicant: KYOCERA Document Solutions Inc., Osaka (JP)

(72) Inventor: Naoto Hanada, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 217 days.

(21) Appl. No.: 16/061,507

(22) PCT Filed: Mar. 9, 2017

(86) PCT No.: PCT/JP2017/009491
§ 371 (c)(1),
(2) Date: Jun. 12, 2018

(87) PCT Pub. No.: WO2017/169630
PCT Pub. Date: Oct. 5, 2017

(30) Foreign Application Priority Data

Mar. 31, 2016 (JP) ................................. 2016-073136
Mar. 31, 2016 (JP) ................................. 2016-073137
Mar. 31, 2016 (JP) ................................. 2016-073138

(51) Int. Cl.
*G06F 3/0488* (2013.01)
*G06F 3/0482* (2013.01)
*G06F 3/0481* (2013.01)

(52) U.S. Cl.
CPC ........ *G06F 3/04883* (2013.01); *G06F 3/0482* (2013.01); *G06F 3/04817* (2013.01)

(58) Field of Classification Search
CPC .................................................. G06F 3/04883
(Continued)

(56) References Cited

U.S. PATENT DOCUMENTS 8,266,550 B1 * 9/2012 Cleron ................ G06F 3/04817
715/863
8,402,391 B1 * 3/2013 Doray ................... G06F 3/0482
715/834
(Continued)

FOREIGN PATENT DOCUMENTS

CN 103577082 A 2/2014
JP H09-269887 A 10/1997
(Continued)

OTHER PUBLICATIONS

The partial supplementary European search report dated Dec. 18, 2019 mailed in the corresponding European Patent Application No. 17774175.8.

*Primary Examiner* — William D Titcomb
(74) *Attorney, Agent, or Firm* — IP Business Solutions, LLC

(57) ABSTRACT

A display device includes a display section, a display control section, a touch panel, a gesture acceptance section, and a processing section. The display control section allows a screen of the display section to display an icon within which a plurality of regions are provided. The gesture acceptance section determines, upon acceptance of a user's gesture on an icon, on which of the regions within the icon the user's gesture has been performed. When the gesture acceptance section accepts the user's gesture on the icon, the processing section executes processing that is related to a function associated with the icon and corresponds to the region on which the gesture has been performed.

14 Claims, 34 Drawing Sheets

(58) Field of Classification Search
USPC ........................................................ 715/835
See application file for complete search history.

(56) References Cited

U.S. PATENT DOCUMENTS

| | | | |
|---|---|---|---|
| 8,543,946 B2* | 9/2013 | Kethireddy | G06F 3/0481 345/157 |
| 8,869,064 B2* | 10/2014 | Kuo | H04M 1/72519 715/810 |
| 2007/0277123 A1* | 11/2007 | Shin | G06F 3/04883 715/863 |
| 2008/0192021 A1* | 8/2008 | Lim | G06F 3/0488 345/173 |
| 2008/0204476 A1* | 8/2008 | Montague | G06F 3/04845 345/661 |
| 2009/0201266 A1 | 8/2009 | Hashimoto | |
| 2009/0303373 A1 | 12/2009 | Yamada | |
| 2010/0100855 A1* | 4/2010 | Yoo | G06F 3/0486 715/863 |
| 2010/0185980 A1* | 7/2010 | Kuo | G06F 3/04817 715/810 |
| 2011/0087981 A1* | 4/2011 | Jeong | G06F 3/04817 715/765 |
| 2012/0272144 A1* | 10/2012 | Radakovitz | G06F 3/04883 715/702 |
| 2012/0291068 A1* | 11/2012 | Khushoo | H04L 12/282 725/38 |
| 2013/0246970 A1* | 9/2013 | Helle | G06F 3/0482 715/822 |
| 2014/0019910 A1* | 1/2014 | Kim | G06F 3/04817 715/810 |
| 2014/0289665 A1* | 9/2014 | Sugiura | G06F 3/04883 715/778 |
| 2014/0380239 A1* | 12/2014 | Kang | G06F 3/0482 715/810 |
| 2015/0363095 A1* | 12/2015 | Jin | G06F 3/04817 715/765 |
| 2016/0139752 A1* | 5/2016 | Shim | G06F 3/04847 715/771 |
| 2016/0210024 A1* | 7/2016 | Choi | G06F 3/0482 |
| 2016/0313893 A1 | 10/2016 | Xu et al. | |
| 2017/0109016 A1* | 4/2017 | Hachiya | G06F 3/04817 |

FOREIGN PATENT DOCUMENTS

| | | |
|---|---|---|
| JP | 2007-122521 A | 5/2007 |
| JP | 2009-183592 A | 8/2009 |
| JP | 2009-294850 A | 12/2009 |
| JP | 2012-073884 A | 4/2012 |
| JP | 2014-013477 A | 1/2014 |
| WO | 2015089820 A1 | 6/2015 |

* cited by examiner

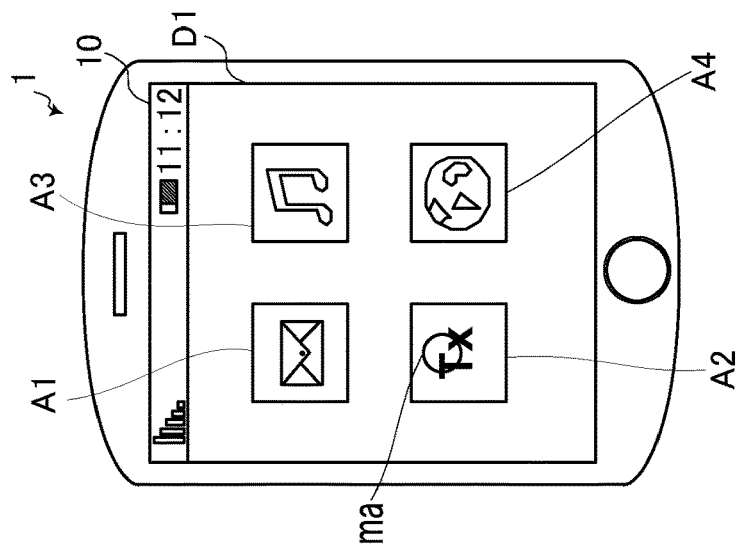
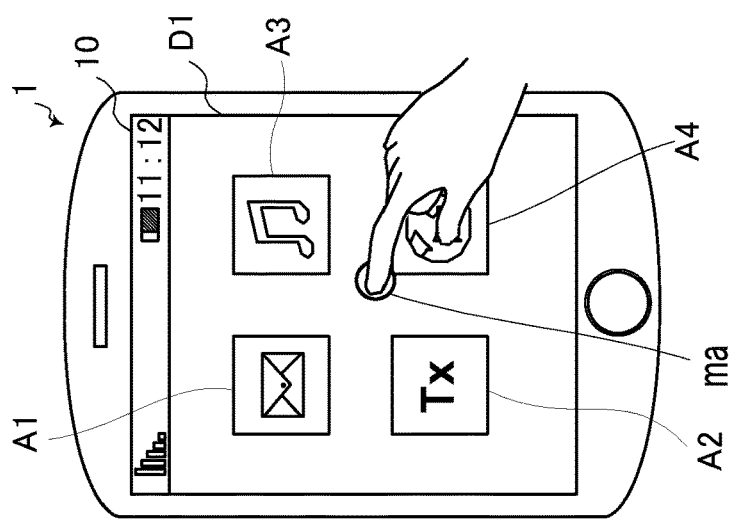
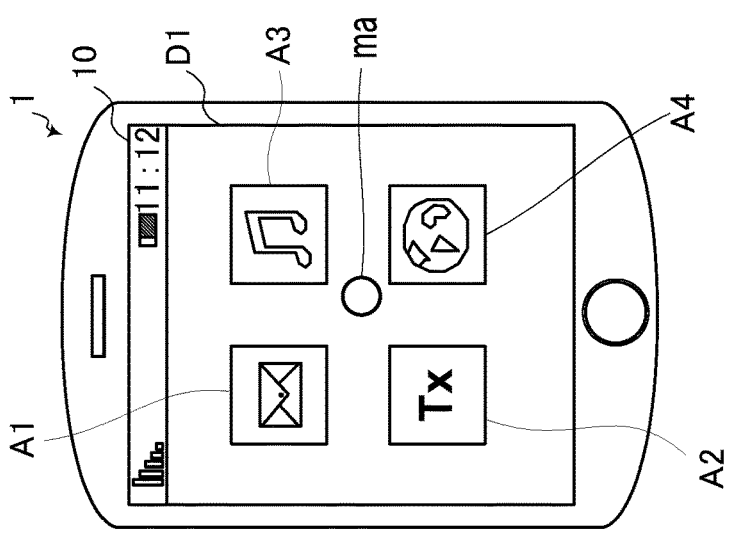

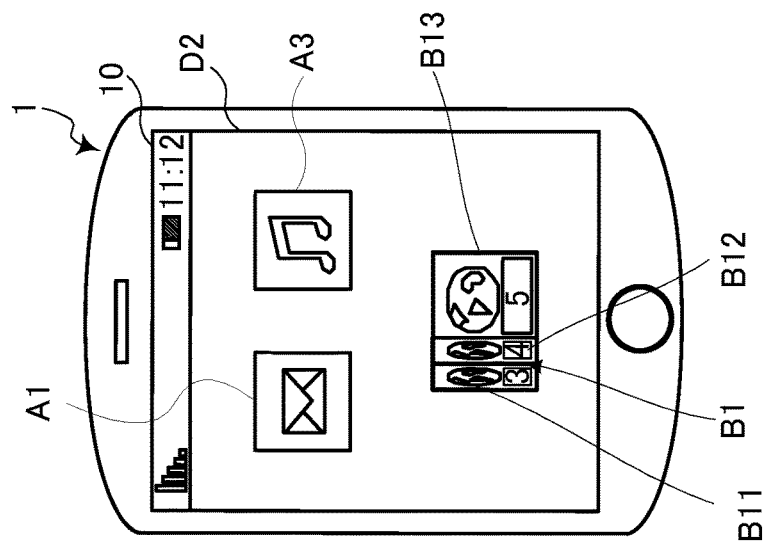
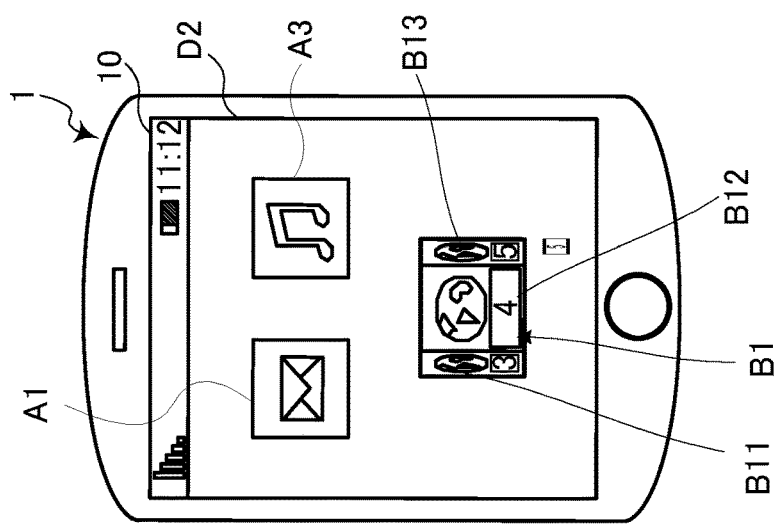
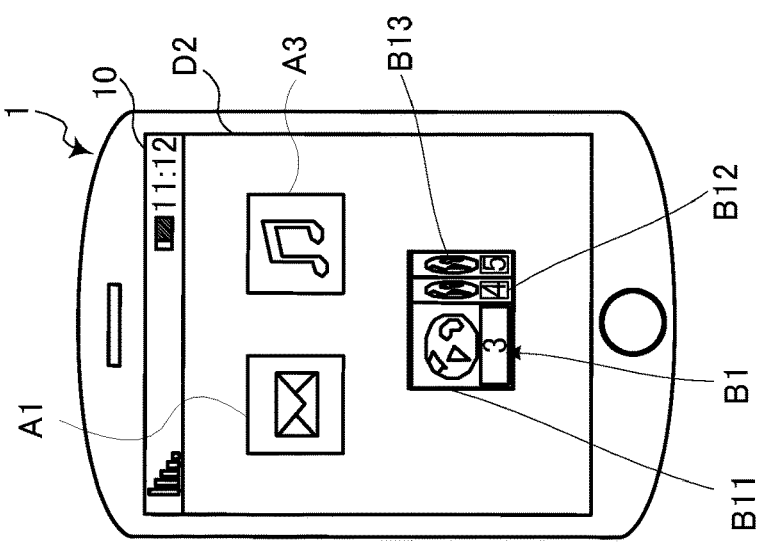

DISPLAY DEVICE

TECHNICAL FIELD

The present invention relates to display devices and particularly relates to a technique for displaying an operation screen on which a plurality of icons are arranged.

BACKGROUND ART

A portable terminal device (also referred to as a display device), such as a smartphone, displays an operation screen on which icons associated with various functions are arranged. By selecting a desired icon on the operation screen, a user can allow the display device to perform a desired function (see, for example, Patent Literature 1 below). Furthermore, by performing an operation by a slide gesture on any icon, the user can change the arrangement of the icons arranged on the operation screen.

CITATION LIST

Patent Literature

Patent Literature 1: JP-A-2009-294850

SUMMARY OF INVENTION

Technical Problem

As described above, by performing a slide gesture on any icon, the user can change the arrangement of the icons arranged on the operation screen. However, in relation to such an operation screen on which a plurality of icons are arranged, there is not only a demand for allowing the arrangement of the icons to be changed, but there is also a demand for allowing various operations to be performed on the icons. For example, it is demanded that in allowing a function corresponding to an icon to be executed, another function related to the above function is concurrently executed by a simpler operation. However, the above display device cannot respond to this demand.

The present invention has been made in view of the foregoing circumstances and is therefore aimed at providing a novel operability on an operation screen on which a plurality of icons are arranged.

Solution to Problem

A display device according to an aspect of the present invention is directed to a display device including: a display section; a display control section that controls a display operation of the display section; a touch panel disposed on a screen of the display section; a gesture acceptance section that accepts a user's gesture through the touch panel; and a processing section that executes processing corresponding to the user's gesture accepted by the gesture acceptance section, wherein the display control section allows the display section to display on the screen an icon which is associated with a function contained in the display device and within which a plurality of regions are provided, wherein the gesture acceptance section determines, upon acceptance of the user's gesture on the icon, on which of the regions within the icon the user's gesture has been performed, and wherein when the gesture acceptance section accepts the user's gesture on the icon, the processing section executes processing related to the function associated with the icon, the processing corresponding to the region on which the gesture has been performed.

Advantageous Effects of Invention

The present invention enables the provision of a novel operability on an operation screen on which a plurality of icons are arranged.

BRIEF DESCRIPTION OF DRAWINGS

FIGS. 3A to 3C are views showing a procedure for setting a second functional image within an image representing an icon displayed on an operation screen of a display device according to a first embodiment.

FIGS. 29A to 29C are views showing changes of the operation screen according to the current time of day in the display device according to the seventh embodiment.

DESCRIPTION OF EMBODIMENTS

Hereinafter, a description will be given of display devices according to embodiments of the present invention with reference to the drawings.

First Embodiment

Figure 1:
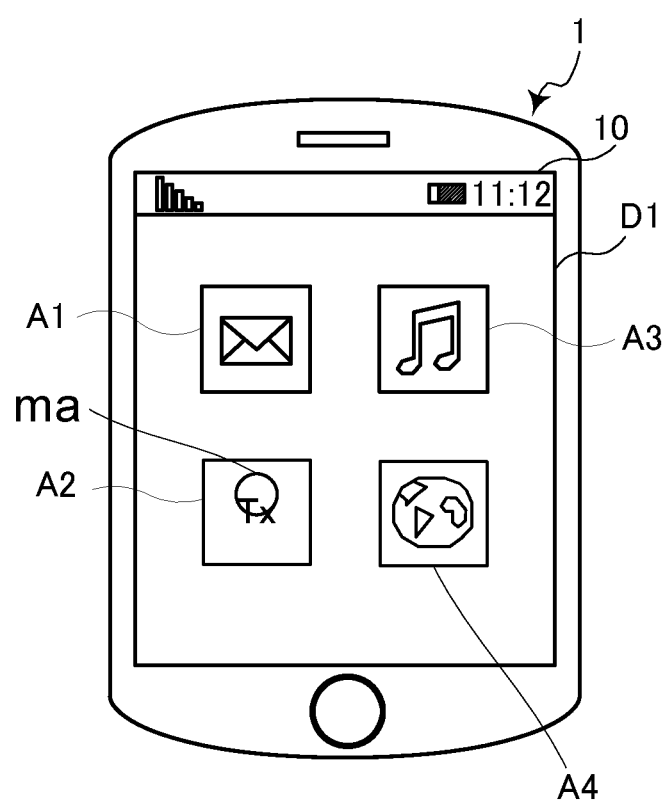
FIG. 1 is a front view showing an appearance of a display device according to an embodiment of the present invention.
Figure 2:
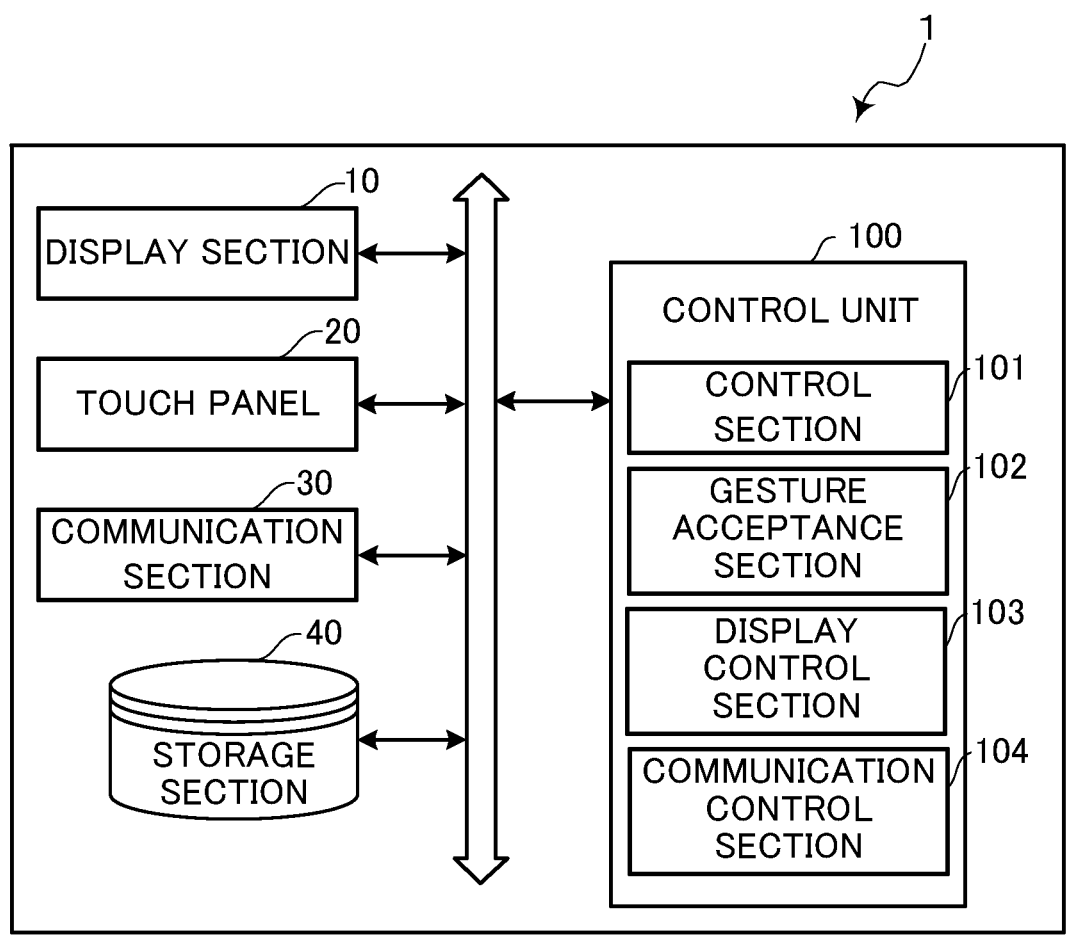
FIG. 2 is a block diagram showing an internal configuration of the display device according to the embodiment of the present invention.

FIG. 1 is a front view showing an appearance of a display device according to a first embodiment of the present invention. FIG. 2 is a block diagram showing an internal configuration of the display device according to the first embodiment of the present invention.

A display device 1 according to the first embodiment of the present invention is, for example, a portable terminal device, such as a smartphone, and includes a display section 10, a touch panel 20, a communication section 30, a storage section 40, and a control unit 100. These components are capable of transferring data or signals to and from each other via a bus.

The display section 10 is formed of a liquid crystal display (LCD), an organic EL (OLED: organic light-emitting diode) or others. As shown in FIG. 1, the display section 10 displays an operation screen D1 on which a plurality of icons A1 to A4 are arranged. These icons A1 to A4 are associated with various respective predetermined functions or files contained in the display device 1. For example, the icon A1 is associated with a mail function. Furthermore, the icon A2 is associated with a text file, the icon A3 is associated with a music file, and the icon A4 is associated with an Internet browser function.

The touch panel 20 is, for example, a touch panel of a so-called resistive film system or a capacitance system. The touch panel 20 is disposed on the screen of the display section 10 and detects a touch of an icon on the operation screen D1 of the display section 10 with a finger or the like, together with the point of touch. When detecting a touch thereon with a finger or the like, the touch panel 20 outputs a detection signal indicating the coordinate of the point of touch to a below-described gesture acceptance section 102 and so on of the control unit 100. In this manner, the touch panel 20 serves as an operating section through which a user's operation by gesture on the operation screen D1 of the display section 10 is to be input.

The touch panel 20 encompasses a touch panel operable to detect a user's finger or the like when the user's finger or the like, even if not directly touching the operation screen, comes within a certain distance of the operation screen. Therefore, the term "touch" used in this embodiment includes a state where a finger or the like coming within the above certain distance of the operation screen is detected, without an actual touch on the operation screen, by the function of the touch panel 20, with the consideration of this state as a substantial touch.

The display device 1 may further include, in addition to the above touch panel 20, physical keys as an operating section through which a user's operation is to be input. Examples of the physical keys include arrow keys, a Page Up key, and a Page Down key.

The communication section 30 is a communication interface including a communication module, such as an unshown LAN chip. The display device 1 is connected via a network to other information processing apparatuses, such as PCs (Personal Computers), and transfers data to and from the PCs connected through the communication section 30.

The storage section 40 is a large storage device, such as a RAM (Random Access Memory) or an HDD (Hard Disk Drive).

The control unit 100 is formed of a CPU (Central Processing Unit), a RAM (Random Access Memory), a ROM (Read Only Memory), and so on. When a control program stored in the above ROM or the storage section 40 is executed by the above CPU, the control unit 100 functions as a control section 101, a gesture acceptance section 102, a display control section 103, and a communication control section 104. Alternatively, each of the above components of the control unit 100 may not be implemented by the operation of the control unit 100 in accordance with the above-described control program but may be constituted by a hardware circuit.

The control section 101 governs the overall operation control of the display device 1. The control section 101 is connected to the display section 10, the touch panel 20, the communication section 30, the storage section 40, and so on and performs the operation control of each of the above components connected thereto and signal or data transfer to and from each of the components.

The control section 101 serves particularly as a processing section for executing processing corresponding to a gesture accepted by the below-described gesture acceptance section 102. For example, when a user performs a gesture for selecting the icon A1 shown in FIG. 1 through the touch panel 20 and the gesture acceptance section 102 accepts the user's gesture (also referred to as a selection gesture) on the icon A1, the control section 101 executes a mail function associated with the icon A1. Specifically, the control section 101 executes a mail program stored in the storage section 40 or the like.

The gesture acceptance section 102 identifies a user's gesture input by a user, based on a detection signal output from the touch panel 20. Then, the gesture acceptance section 102 accepts the identified user's gesture and outputs a control signal corresponding to the user's gesture to the control section 101, the display control section 103, the communication control section 104, and so on.

Examples of the user's gesture include a touch gesture, a slide gesture (including a flick gesture and a swipe gesture), a drag gesture, a pinch-out gesture, and a pinch-in gesture. For example, when the user touches the touch panel 20 with his/her finger and then releases the finger from the point of touch, the touch panel 20 outputs to the gesture acceptance section 102 a detection signal indicating the point at which the touch has been detected. When receiving the detection signal, the gesture acceptance section 102 identifies a user's gesture input by the user as a touch gesture and accepts the touch gesture. For another example, when the user moves his/her finger on the touch panel 20 while keeping it in touch with the touch panel 20, the touch panel 20 outputs to the gesture acceptance section 102 detection signals indicating a series of points of movement from an initial point at which the touch has been first detected to a latest point at which the touch has been last detected. When receiving the detection signals, the gesture acceptance section 102 identifies a user's gesture input by the user as a slide gesture, also identifies the direction of operation of the slide gesture, and accepts the slide gesture.

The communication control section 104 has the function of controlling the communication operation of the communication section 30. The display control section 103 has the function of controlling the display operation of the display section 10.

In the first embodiment, in executing a function corresponding to an icon, another function related to the above function is enabled to be executed by a simpler operation. Specifically, an icon and a second functional image set within an image representing the icon are previously displayed on a screen of the display section 10 and, upon a touch gesture on the second functional image, the function corresponding to the icon is executed in association with the function corresponding to the second functional image. Thus, two functions can be executed in association with each other by a single touch gesture on the second functional image, which enables the operation to be simplified.

For example, within an image representing the icon A2 displayed on the operation screen D1 of the display section 10, a second functional image ma smaller than the display region of the icon A2 is set. This second functional image ma is set, for example, in the following procedure.

First, assume that, as shown in FIG. 3A, the icons A1 to A4 and the second functional image ma are displayed on the operation screen D1 of the display section 10. When in this state a touch gesture on the second functional image ma is performed as shown in FIG. 3B and consecutively a slide gesture on the second functional image ma is performed, the gesture acceptance section 102 accepts this slide gesture and the display control section 103 executes processing for moving the second functional image ma in a direction of the slide gesture. Then, when, as shown in FIG. 3C, the second functional image ma is moved to an arbitrary location within the image representing the icon A2 and the slide gesture is completed, the display control section 103 positions the second functional image ma at the arbitrary location within the image representing the icon A2. Furthermore, when a certain time has passed after the positioning of the second functional image ma, the display control section 103 fixes the second functional image ma at the arbitrary location within the image representing the icon A2. Until the certain time has passed, it is possible to move the second functional image ma again by a slide gesture. In this manner, the second functional image ma is set at an arbitrary location within the image representing the icon A2.

Such a second functional image ma has, for example, the function of providing an instruction to print the text of a text file associated with the icon A2 and an instruction on a print setting for the text. Specifically, the function corresponding to the second functional image ma is a function to be implemented by the execution of a preset program, which is the function of activating a print driver and providing an instruction on a print setting for the text to the print driver. Examples of the print setting include "2 in 1" for arranging two pages of a text on one recording paper sheet, "4 in 1" for arranging four pagers of a text on one recording paper sheet, black-and-white printing, and color printing. The print driver is instructed on such a print setting.

When the gesture acceptance section 102 determines, based on a detection signal output from the touch panel 20, that a touch gesture has been performed on the second functional image ma within the image representing the icon A2, the gesture acceptance section 102 outputs a control signal corresponding to this touch gesture. Based on this control signal, the control section 101 reads from the storage section 40 the text file associated with the icon A2 on which the touch gesture has been performed. Then, the display control section 103 allows the display section 10 to display the text of the text file on the screen. Furthermore, based on the control signal, the control section 101 activates the print driver (program) and provides an instruction on a print setting corresponding to the second functional image ma to the print driver. The print driver generates print data on the text based on the print setting and transmits the print data from the communication section 30 via the network to a printer (not shown) on the network. The printer receives the print data and prints a text represented by the print data on a recording paper sheet.

As a result of the above processing, a plurality of regions, including a region provided with the second functional image ma and the other region, are provided within the icon displayed on the display section 10. Furthermore, in the above processing, the gesture acceptance section 102 determines, upon acceptance of the user's gesture on the icon, on which of the regions within the icon the user's gesture has been performed, i.e., whether the user's gesture has been performed on the region provided with the second functional image ma or on the other region. Then, when the gesture acceptance section 102 accepts the user's gesture on the icon, the control section 101 executes processing that is related to the function associated with the icon and corresponds to the region on which the gesture has been performed, i.e., processing corresponding to the region provided with the second functional image ma or the other region.

Figure 4:
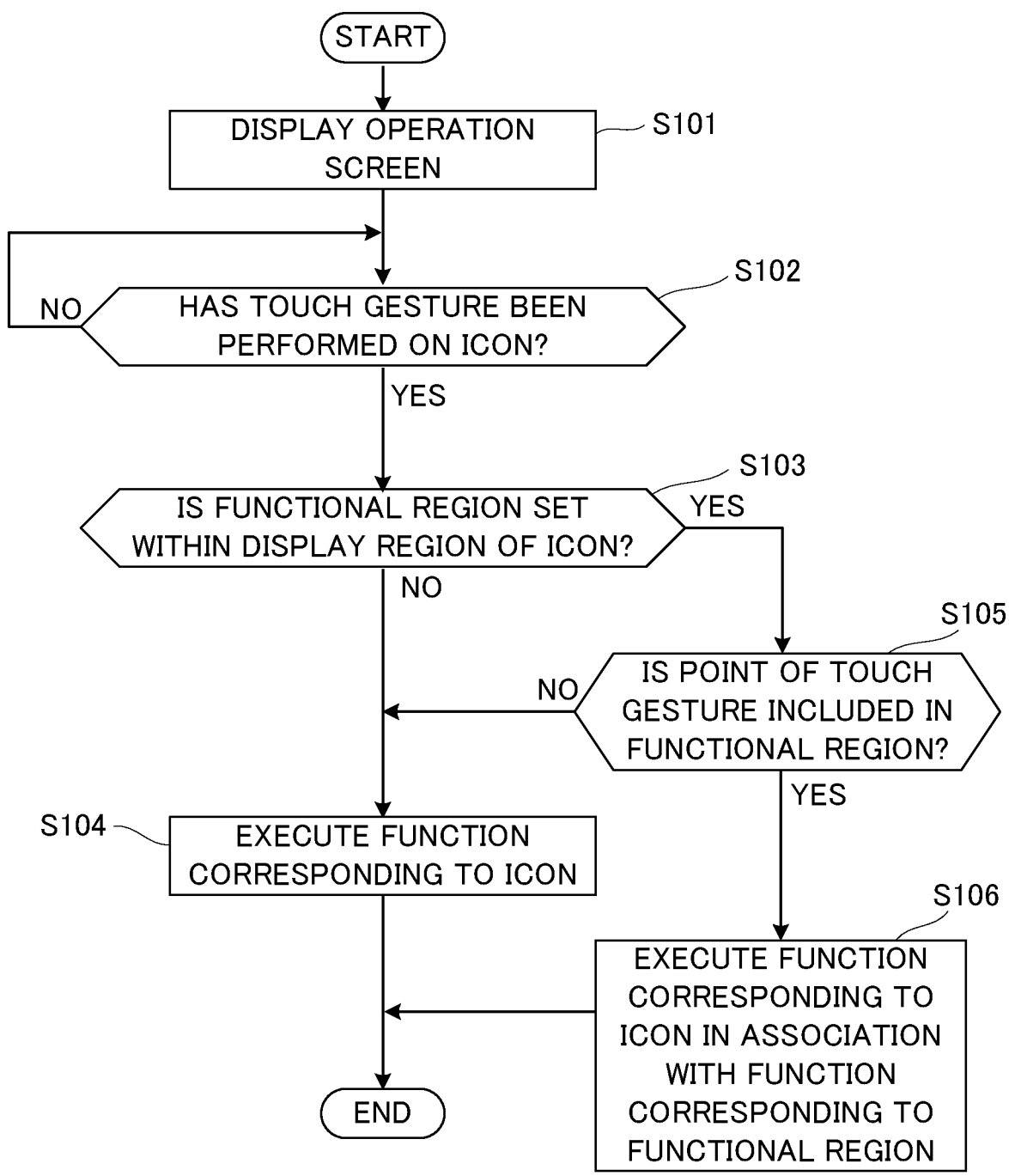
FIG. 4 is a flowchart showing a procedure for control of the display device according to the first embodiment based on a gesture performed on an icon.

Next, a description will be given of a procedure for control of the display device 1 according to the first embodiment based on a gesture performed on an icon, with reference to a flowchart shown in FIG. 4.

The display control section 103 first reads data on an operation screen stored in the storage section 40 and allows the display section 10 to display the operation screen D1 (step S101).

Then, when the gesture acceptance section 102 accepts a touch gesture on an icon placed on the operation screen D1 ("Yes" in step S102), it determines whether or not a second functional image ma is set within an image representing the icon on which the touch gesture has been performed (step S103). For example, if the gesture acceptance section 102 determines that no second functional image ma is set within the image representing the icon on which the touch gesture has been performed ("No" in step S103), the control section 101 executes a function corresponding to the icon on which the touch gesture has been performed (step S104).

On the other hand, if the gesture acceptance section 102 determines that a second functional image ma is set within the image representing the icon on which the touch gesture has been performed ("Yes" in step S103), it further determines whether or not the point of the touch gesture is included in the second functional image ma within the image representing the icon (step S105). Then, if the gesture acceptance section 102 determines that the point of the touch gesture is included in the second functional image ma within the image representing the icon ("Yes" in step S105), the control section 101 executes the function corresponding to the icon in association with the function corresponding to the second functional image ma (step S106).

If the gesture acceptance section 102 determines that the point of the touch gesture is not included in the second functional image ma within the image representing the icon ("No" in step S105), the control section 101 executes only the function corresponding to the icon (step S104).

For example, if the point of the touch gesture is included in the second functional image ma within the image representing the icon A2 ("Yes" in step S105), the text file corresponding to the icon A2 is read from the storage section 40, the text of the text file is displayed on the screen of the display section 10, and the function corresponding to the second functional image ma is executed to activate the print driver (step S106). On the other hand, if the point of the touch gesture is not included in the second functional image ma within the image representing the icon A2 ("No" in step S105), the text of the text file corresponding to the icon A2 is displayed on the screen of the display section 10 (step S104), but the function corresponding to the second functional image ma is not executed.

As thus far described, in the display device 1 according to the first embodiment of the present invention, when a touch gesture is performed on an icon on the operation screen D1, it is determined whether or not a second functional image ma is set within an image representing the icon on which the touch gesture has been performed. If no second functional image ma is set within the image representing the icon on which the touch gesture has been performed or if the second functional image ma is set within the image representing the icon on which the touch gesture has been performed but the point of the touch gesture is not included in the second functional image ma within the image representing the icon, only the function corresponding to the icon on which the touch gesture has been performed is executed. On the other hand, if the point of the touch gesture is included in the second functional image ma within the image representing the icon, the function corresponding to the icon is executed in association with the function corresponding to the second functional image ma. Therefore, two functions can be executed in association with each other by a single touch gesture on a second functional image ma within an image representing an icon, so that the operation can be simplified to provide a novel operability to the user.

<Modification 1-1>

Although in the first embodiment a single second functional image ma is set within an image representing an icon, a plurality of second functional images may be set within the image representing the icon.

Figure 5:
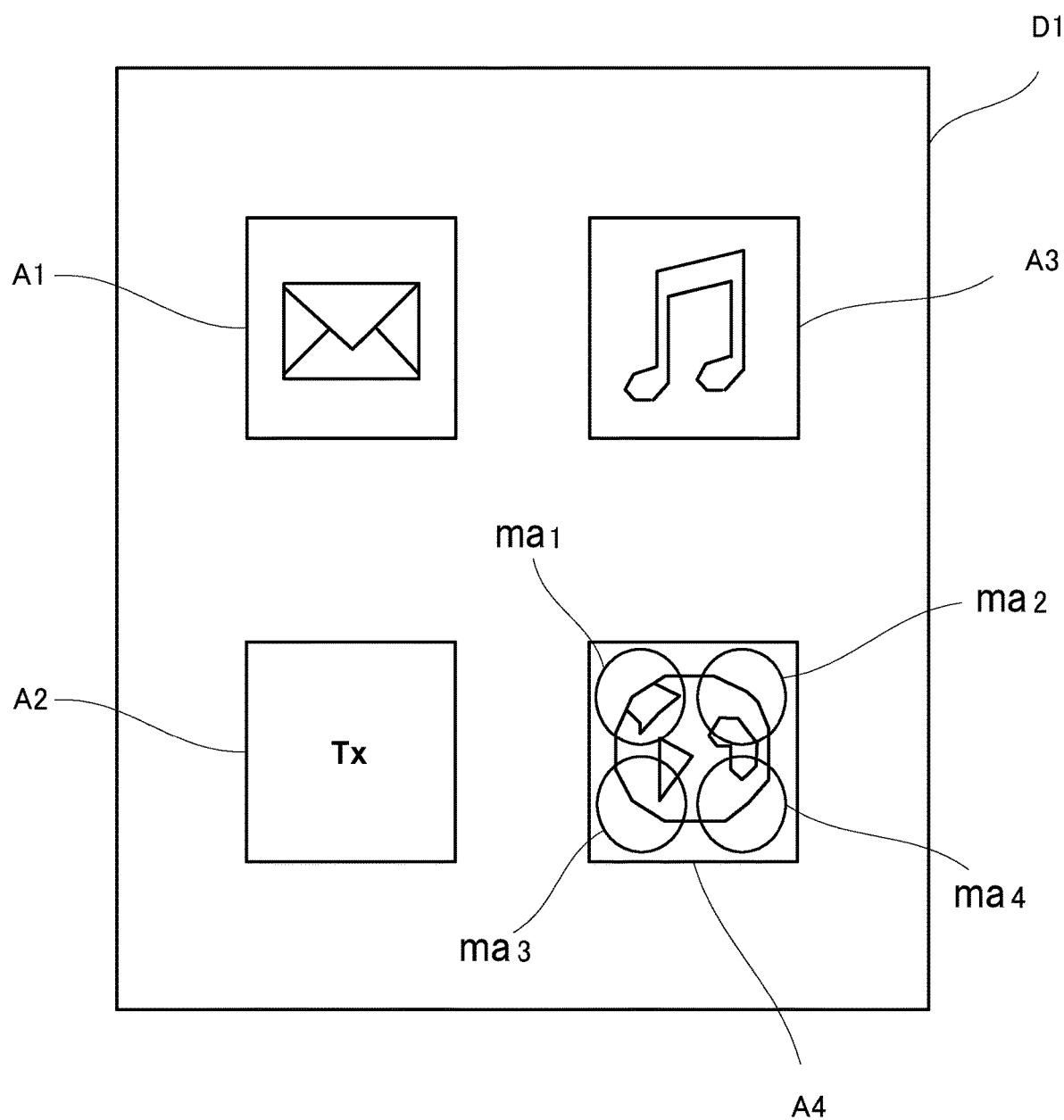
FIG. 5 is a view showing a plurality of second functional images within an image representing an icon in a modification of the first embodiment.

For example, as shown in FIG. 5, four second functional images ma1, ma2, ma3, and ma4 are set within an image representing an icon A4. These second functional images ma1, ma2, ma3, and ma4 are set at respective arbitrary locations within the image representing the icon A4 by repeating the procedure shown in FIGS. 3A to 3C. Furthermore, an arbitrary number of second functional images can be set within an image representing one icon.

The icon A4 is associated with an Internet browser function. Furthermore, the respective functions corresponding to the second functional images ma1 to ma4 are functions to be implemented by the execution of preset programs and are functions of instructing the Internet browser function corresponding to the icon A4 on respective sites on the Net to be first accessed upon execution of the Internet browser function.

For example, by the function corresponding to the second functional image ma1, the Internet browser function is given instruction on a site for weather forecast as the site to be first accessed. Furthermore, by the function corresponding to the second functional image ma2, the Internet browser function is given instruction on a site frequently used for work as the site to be first accessed. Moreover, by the function corresponding to the second functional image ma3, the Internet browser function is given instruction on a site for pleasure as the site to be first accessed. Furthermore, by the function corresponding to the second functional image ma4, the Internet browser function is given instruction on a site for news as the site to be first accessed.

When the gesture acceptance section 102 determines, based on a detection signal output from the touch panel 20, that a touch gesture has been performed on the second functional image ma1 within the image representing the icon A4, the gesture acceptance section 102 accepts the touch gesture and outputs a control signal corresponding to this touch gesture to the control section 101. When the control section 101 determines, based on the control signal, the icon A4 and the second functional image ma1 on which the touch gesture has been performed, it executes the Internet browser function corresponding to the icon A4 and also executes the function corresponding to the second functional image ma1 to give the Internet browser function instruction on the site for weather forecast as the site to be first accessed. According to the execution of the Internet browser function, the communication control section 104 first accesses, through the communication section 30, the site for weather forecast on the Net set by the Internet browser function and receives data of the site and the display control section 103 then allows the display section 10 to display the site for weather forecast on the screen.

Likewise, when a touch gesture is performed on the second functional image ma2 within the image representing the icon A4, the site frequently used for work is first accessed and the site is displayed on the screen of the display section 10. When a touch gesture is performed on the second functional image ma3, the site for pleasure is first accessed and the site is displayed on the screen of the display section 10. When a touch gesture is performed on the second functional image ma4, the site for news is first accessed and the site is displayed on the screen of the display section 10.

Therefore, the site to be first displayed on the screen of the display section 10 varies according to on which of the second functional images ma1 to ma4 within the image representing the icon A4 a touch gesture has been performed.

<Modification 1-2>

In Modification 1-1 described above, a plurality of second functional images ma1 to ma4 are set within the image representing the icon A4. Therefore, when a touch gesture is performed on an arbitrary one of the second functional images, another second functional image adjacent to the arbitrary second functional image may also be touched together.

To cope with this, the gesture acceptance section 102 detects, through the touch panel 20, the range of the touch on the icon A4 during the user's gesture, selects, among the second functional images ma1 to ma4 within the image representing the icon A4, the second functional image having the widest area overlapping with the range of the touch, and accepts the user's gesture on the selected second functional image. Thus, even if the second functional images ma1 to ma4 are set in immediate proximity to each other within the image representing the icon A4, an arbitrary second functional image on which the touch gesture has been performed by the user can be correctly selected.

<Modification 1-3>

Furthermore, when, with a plurality of second functional images displayed within an image representing an icon, a slide gesture across two or more second functional images is performed, the respective functions corresponding to the two or more second functional images across which the slide gesture has been performed may be executed in combination.

Figure 6:
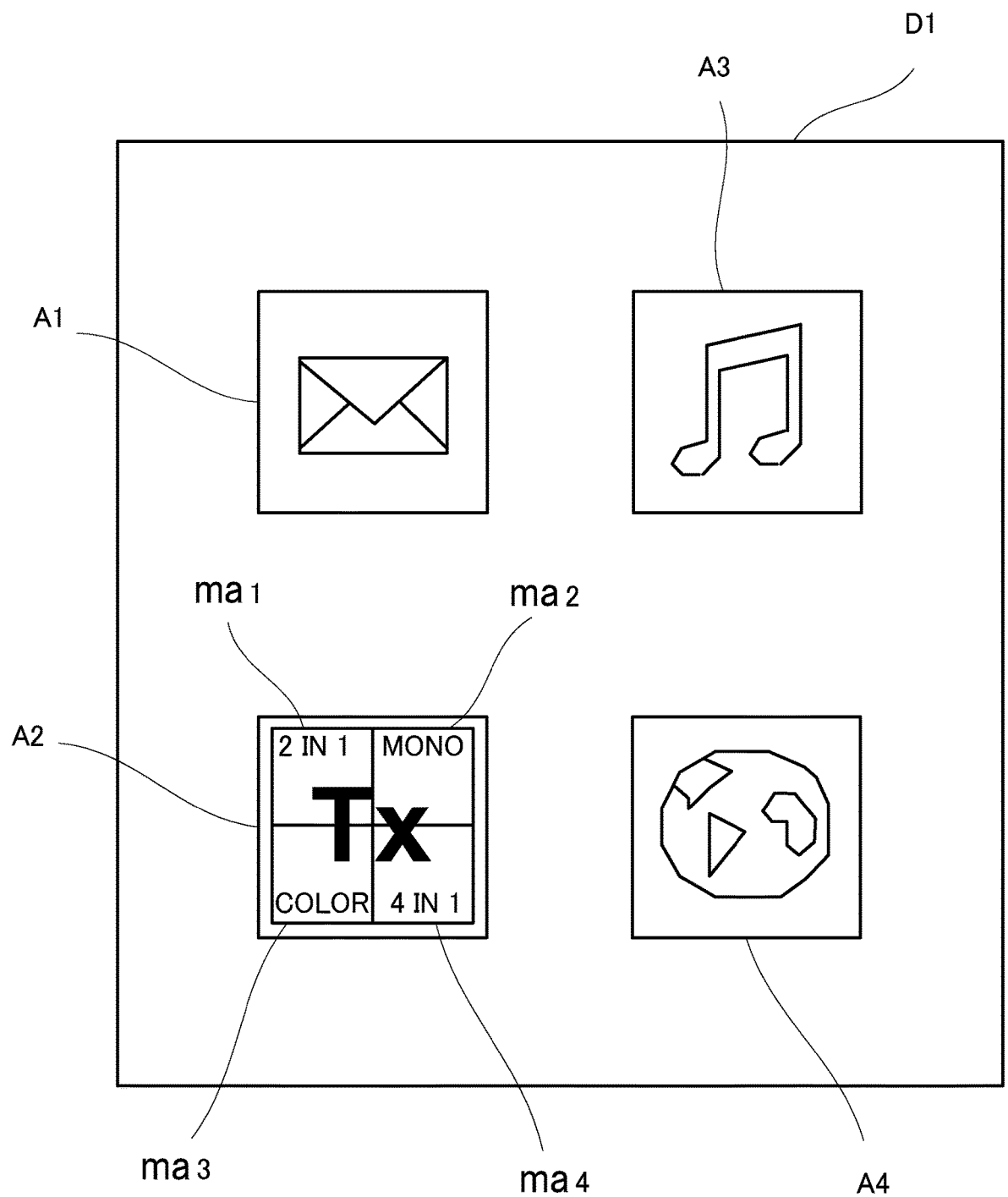
FIG. 6 is a view showing a plurality of second functional images within an image representing an icon in another modification of the first embodiment.

For example, assume that, as shown in FIG. 6, four second functional images ma1, ma2, ma3, and ma4 are set within an image representing an icon A2. These second functional images ma1, ma2, ma3, and ma4 correspond to print settings "2 in 1", black-and-white printing, color printing, and "4 in 1", respectively.

When in this situation a touch gesture is performed on one of the second functional images ma1 to ma4, the function corresponding to the icon A2 is executed in association with the function corresponding to the second functional image on which the touch gesture has been performed. Alternatively, when a slide gesture is performed on the icon A2 to pass across two or more of the second functional images ma1 to ma4, the function corresponding to the icon A2 is executed in association with the functions corresponding to the two or more second functional images across which the slide gesture has been performed. For example, when a slide gesture is performed across the two second functional images ma1 and ma2, the text of the text file corresponding to the icon A2 is printed in "2 in 1" and black-and-white modes.

Second Embodiment

Next, a description will be given of a display device according to a second embodiment of the present invention. A display device 1 according to the second embodiment has an appearance and an internal configuration shown in FIGS. 1 and 2 like the first embodiment, but differs from that according to the first embodiment in the display control and display mode of icons displayed on the screen of the display section 10.

Figure 7:
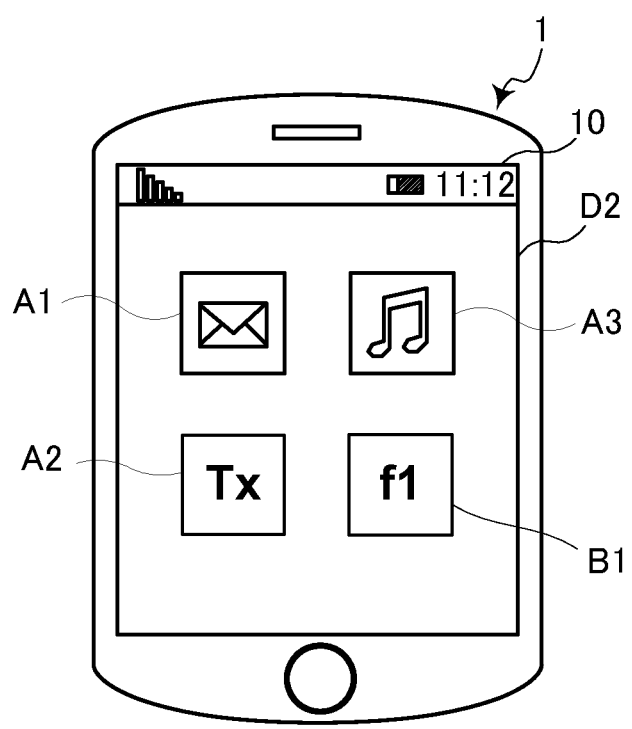
FIG. 7 is a view showing an operation screen of a display device according to a second embodiment.
Figure 8:
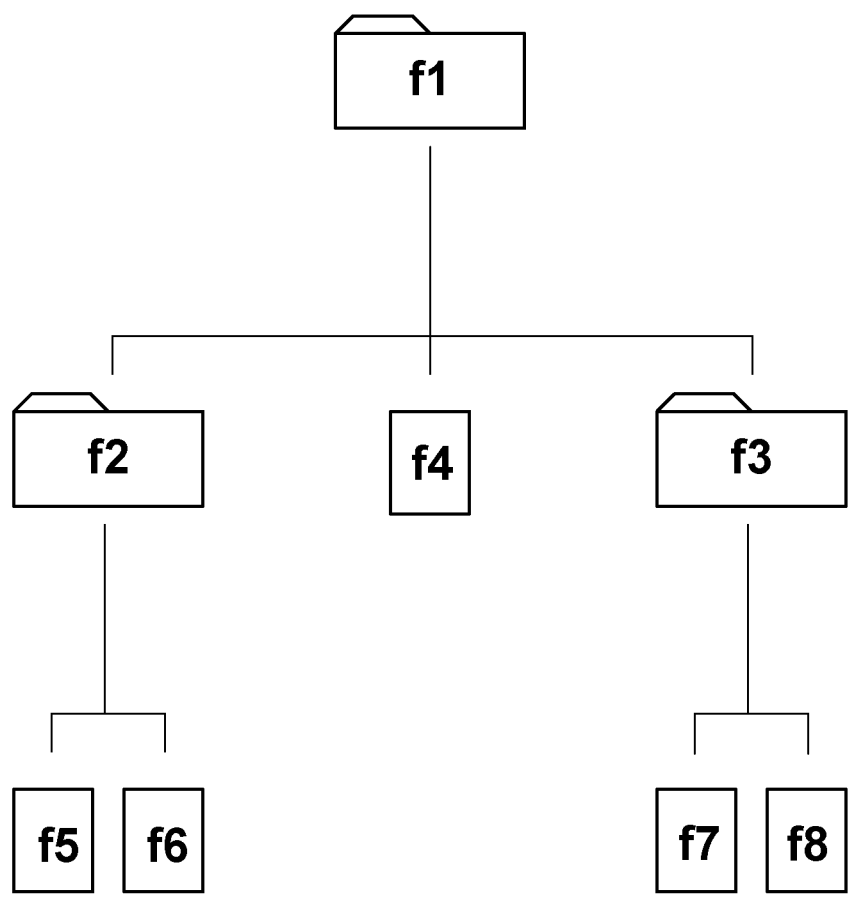
FIG. 8 is a diagram illustrating a hierarchical structure of folders and files.

In the second embodiment, an operation screen D2 on which, for example, as shown in FIG. 7, a plurality of icons A1 to A3 and an icon B1 are arranged is displayed on the display section 10 of the display device 1. The icons A1 to A3 are associated with their respective functions. The icon B1 is associated with a plurality of folders and/or files having a hierarchical structure.

For example, the icon B1 is associated with the highest-order folder f1 in the hierarchical structure. In addition, two lower-order folders f2 and f3 and a lower-order file f4 belong to the highest-order folder f1, two even lower-order files f5 and f6 belong to the folder f2, and two even lower-order files f7 and f8 belong to the folder f3.

The folders and files are displayed within the image representing the icon B1 to reflect their hierarchical structure.

Figure 9:
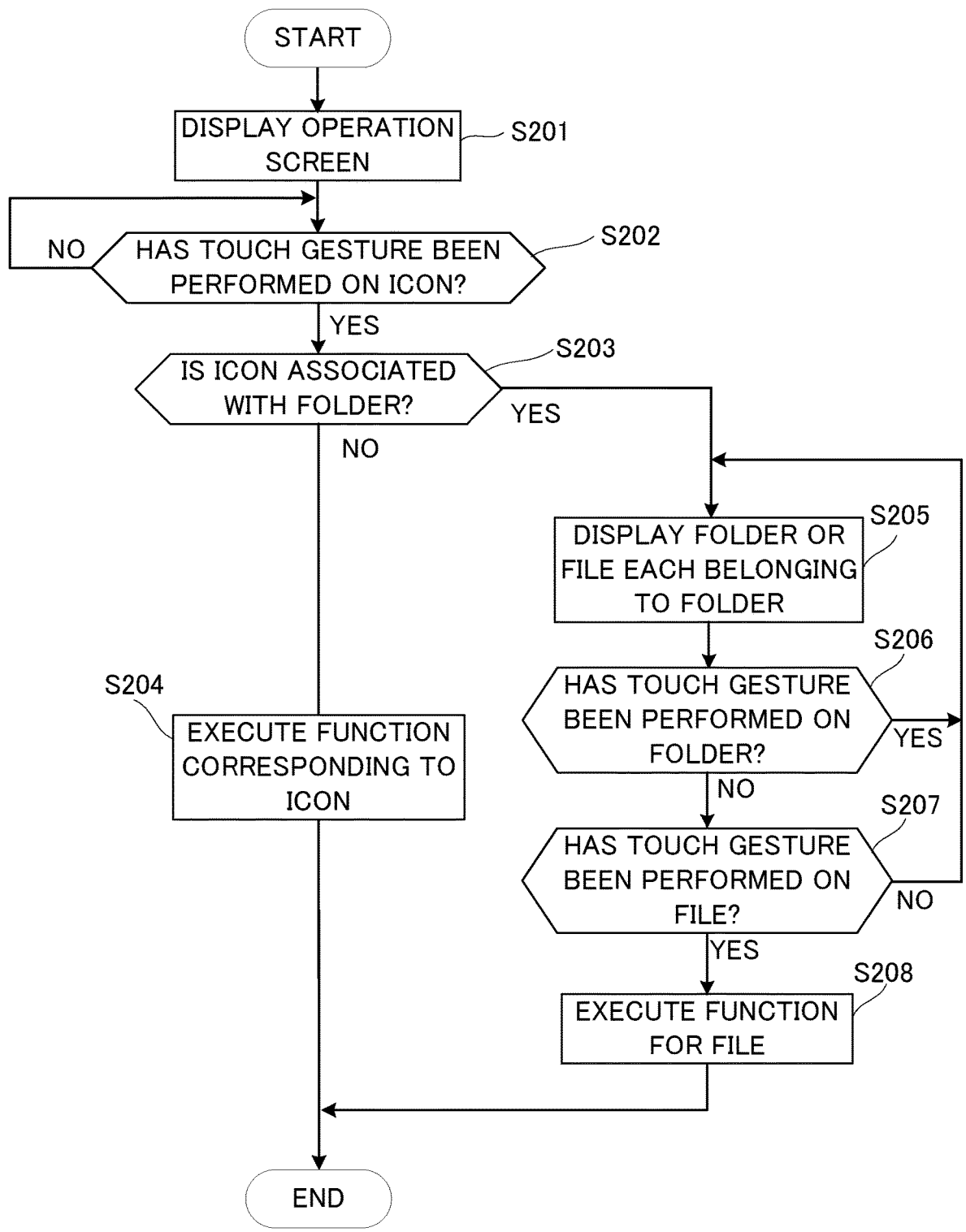
FIG. 9 is a flowchart showing a procedure for control of the display device according to the second embodiment based on a gesture performed on an icon.

Next, a description will be given of a procedure for control of the display device 1 according to the second embodiment based on a gesture performed on an icon, with reference to a flowchart shown in FIG. 9.

The display control section 103 first reads data on an operation screen stored in the storage section 40 and allows the display section 10 to display the operation screen D2 (step S201).

Then, when the gesture acceptance section 102 accepts a touch gesture on an icon placed on the operation screen D2 ("Yes" in step S202), it determines whether or not the icon on which the touch gesture has been performed is associated with any folder (step S203). For example, if the gesture acceptance section 102 determines that the icon on which the touch gesture has been performed is not associated with any folder ("No" in step S203), the control section 101 executes a function corresponding to the icon on which the touch gesture has been performed (step S204).

On the other hand, if the gesture acceptance section 102 determines that, for example, the icon B1 on which the touch gesture has been performed is associated with the folder f1 ("Yes" in step S203), the display control section 103 allows, as shown in FIG. 10 A, a second functional image mb1 corresponding to the folder f1 and respective second functional images mb2, mb3, and mb4 corresponding to the two folders f2, f3 and the file f4 all belonging to the folder f1 to be displayed within the image representing the icon B1 (step S205).

Figure 10A:
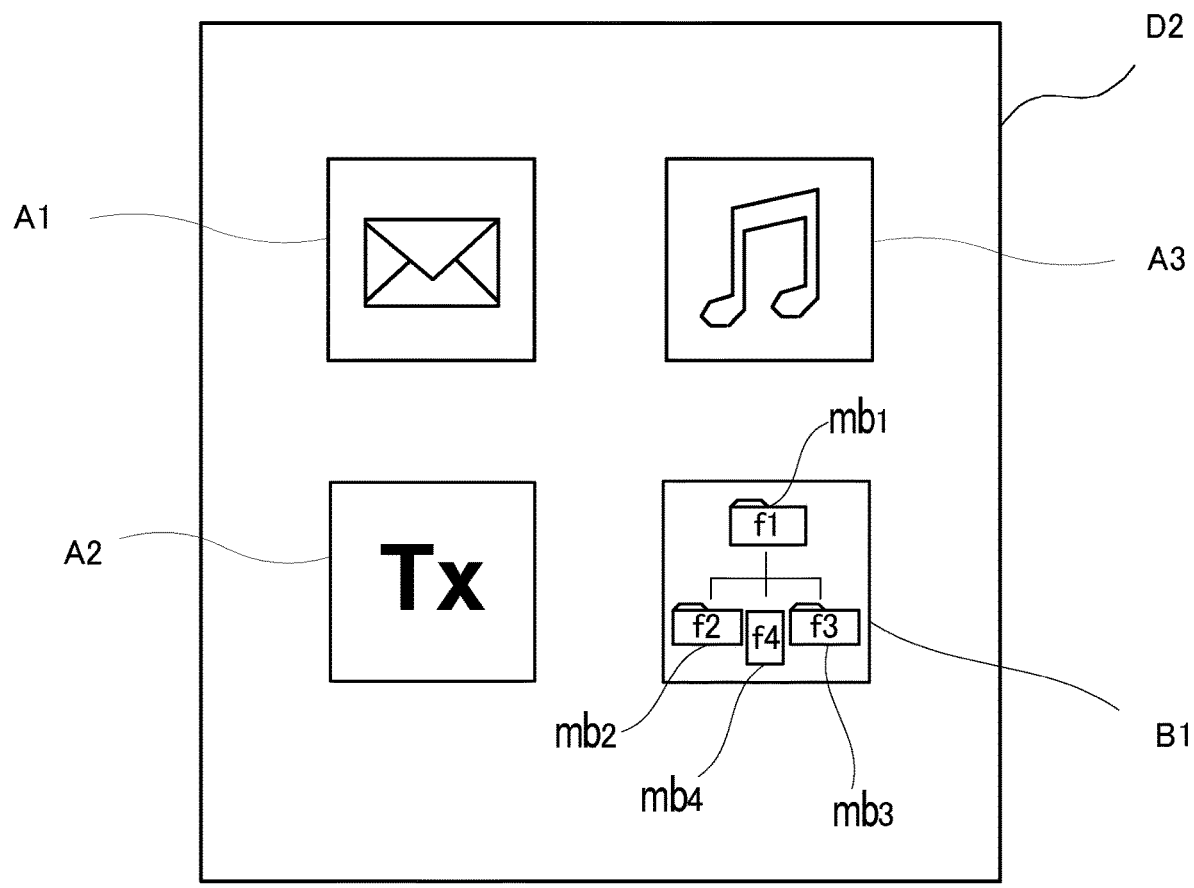
FIGS. 10A to 10C are views each showing a hierarchical structure in an image representing an icon displayed on an operation screen of the display device according to the second embodiment.
Figure 10B:
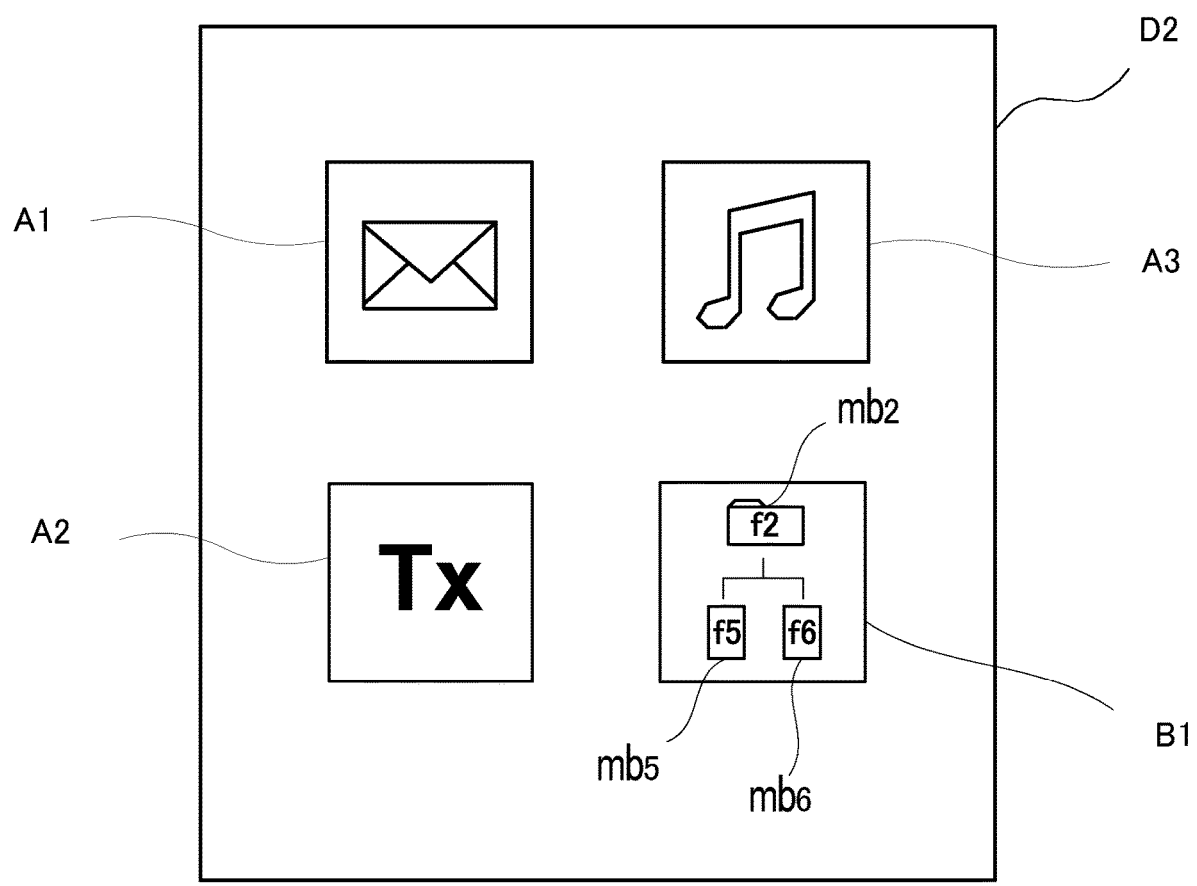

Then, if the gesture acceptance section 102 determines a touch gesture on the second functional image mb2 corresponding to the folder f2 ("Yes" in step S206), the display control section 103 allows, as shown in FIG. 10B, the second functional image mb2 corresponding to the folder f2 and respective second functional images mb5, mb6 corresponding to the two files f5, f6 belonging to the folder f2 to be displayed within the image representing the icon B1 (step S205).

Figure 10C:
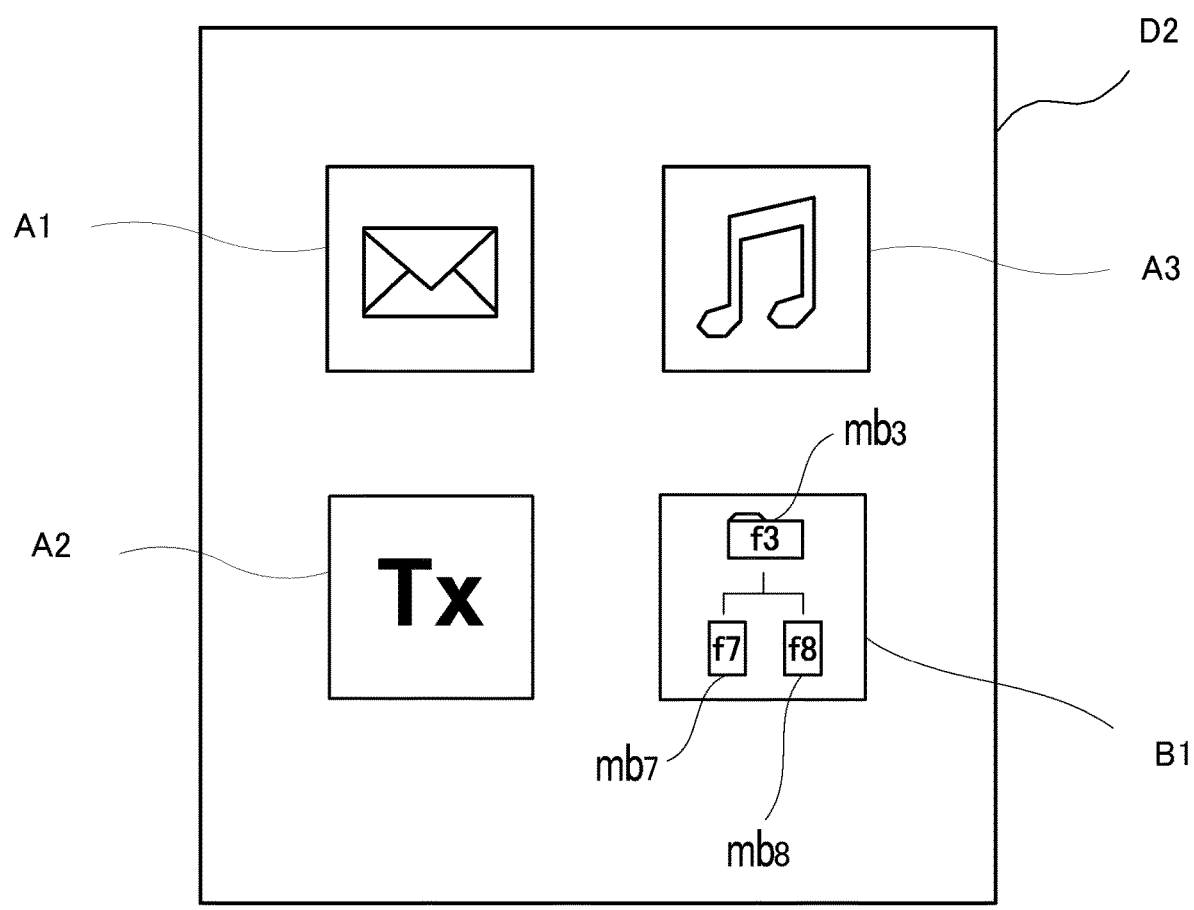

Likewise, if a touch gesture on the second functional image mb3 corresponding to the folder f3 in FIG. 10A is determined ("Yes" in step S206), as shown in FIG. 10C, the second functional image mb3 corresponding to the folder f3 and respective second functional images mb7, mb8 corresponding to the two files f7, f8 belonging to the folder f3 are displayed within the image representing the icon B1 (step S205).

If the gesture acceptance section 102 determines a touch gesture on one of the second functional images mb4, mb5, mb6, mb7, and mb8 corresponding to the files f4, f5, f6, f7, and f8, respectively ("Yes" in step S207), the control section 101 reads from the storage section 40 the file corresponding to the second functional image on which the touch gesture has been performed, and executes the function corresponding to the file (step S208). For example, the control section 101 opens the file and the display control section 103 allows the display section 10 to display the contents of the file on the screen.

As seen from the above, in the display device 1 according to the second embodiment of the present invention, a folder or a file can be selected by a touch gesture thereon according to a hierarchical structure, which simplifies the operation for selecting a folder or a file and thus enabling the provision of a novel operability to the user.

<Modification 2-1>

Although in the second embodiment the size of the display region of an icon is held constant, the size of the display region of the icon may be changed.

Figure 11A:
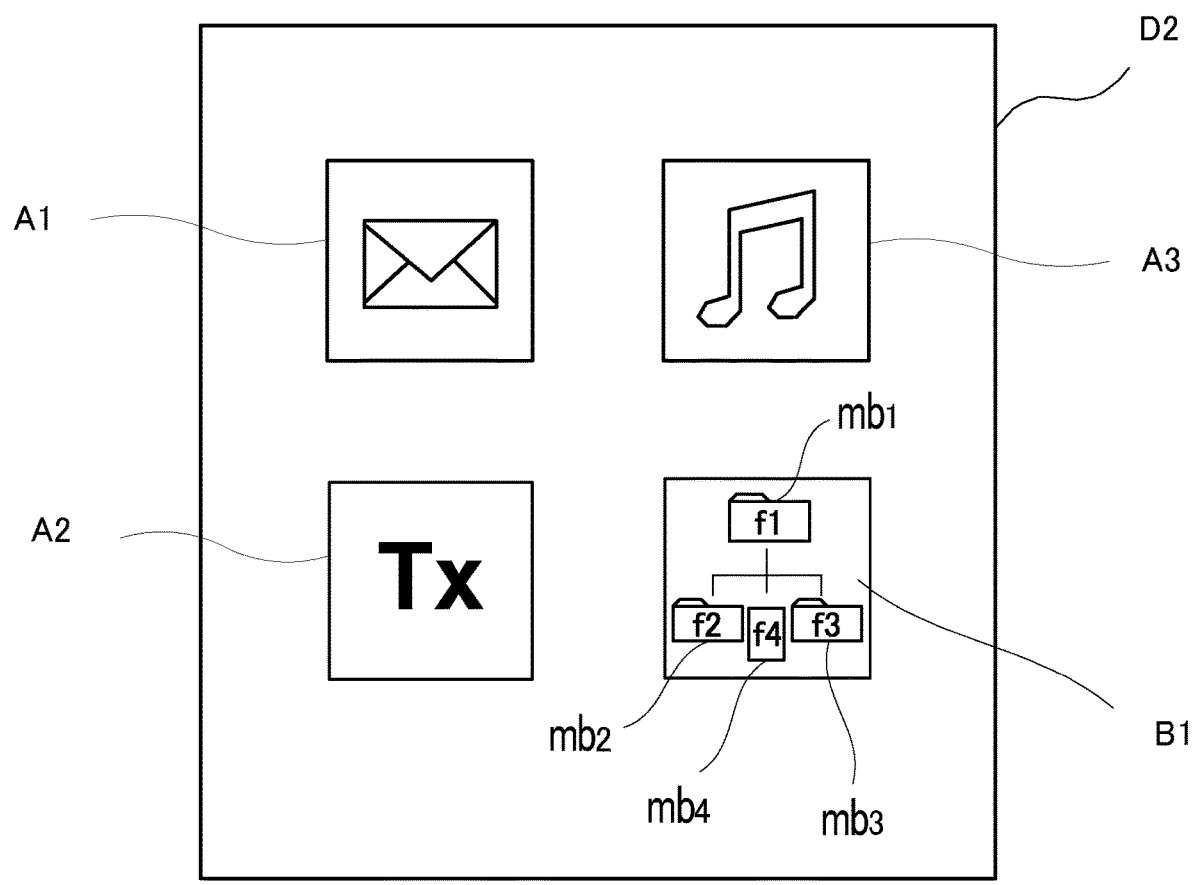
FIGS. 11A to 11C are views each showing a display region of an icon displayed on the operation screen of the display device according to the second embodiment.
Figure 11B:
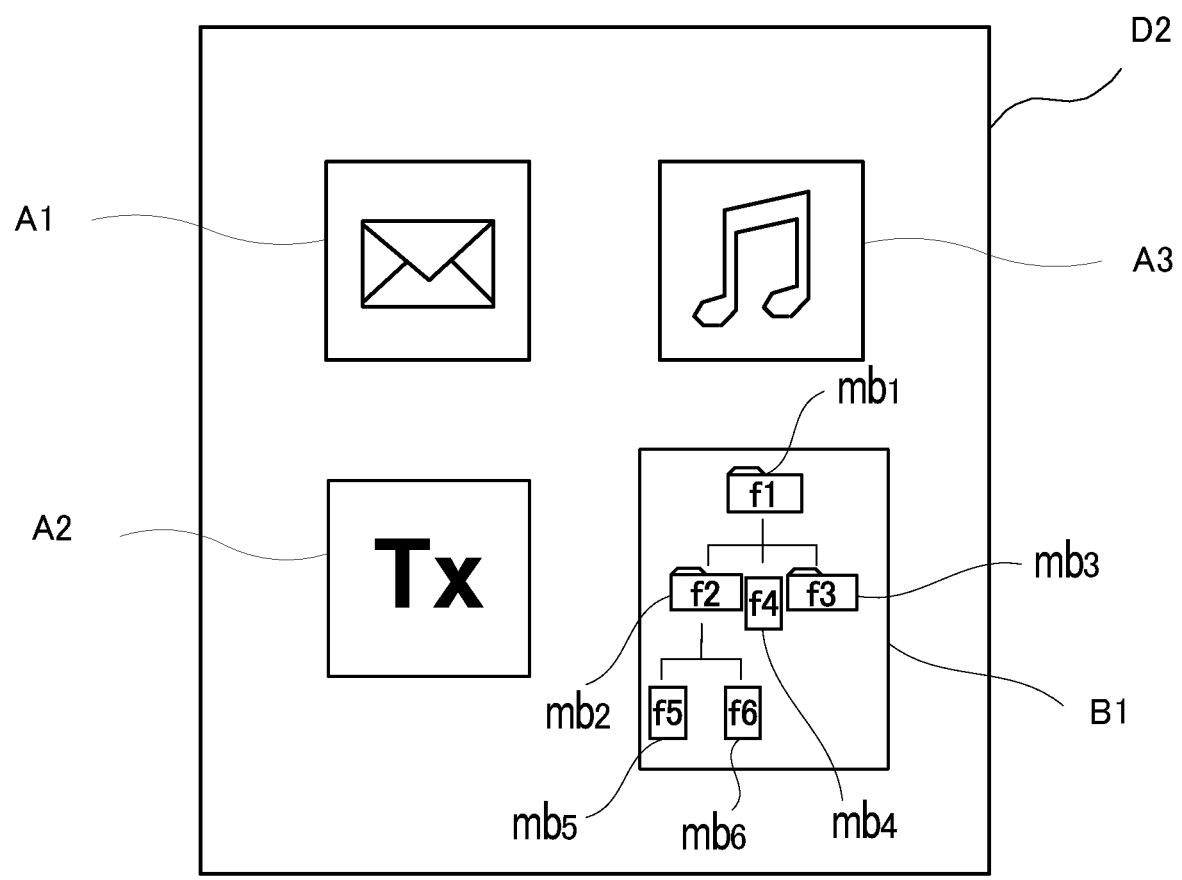
Figure 11C:
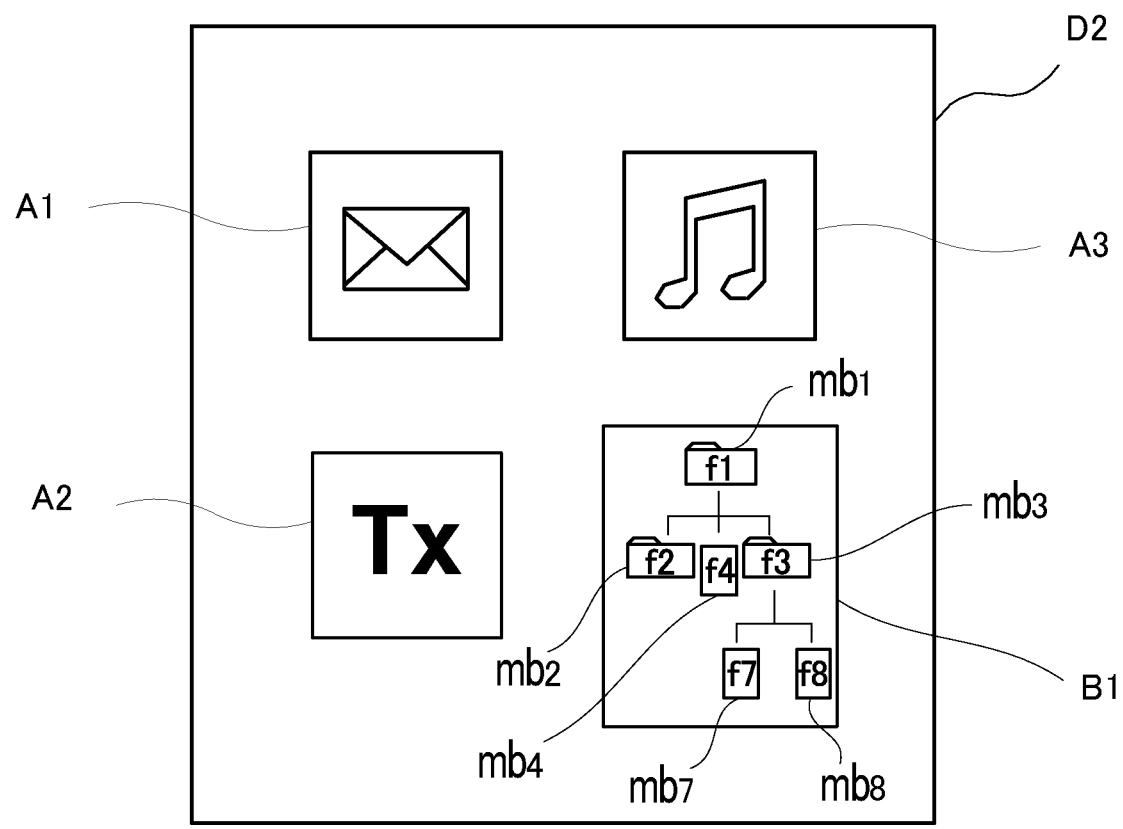

For example, if the gesture acceptance section 102 determines a touch gesture on the icon B1, the display control section 103 allows, as shown in FIG. 11A, the second functional image mb1 corresponding to the folder f1 and the respective second functional images mb2 to mb4 corresponding to the two folders f2, f3 and the file f4 all belonging to the folder f1 to be displayed within the image representing the icon B1. Then, if the gesture acceptance section 102 determines a touch gesture on the folder f2, the display control section 103 expands, as shown in FIG. 11B, the display region of the icon B1 and allows, in addition to the second functional image mb1 and the three second functional images mb2 to mb4, the respective second functional images mb5, mb6 corresponding to the two files f5, f6 belonging to the folder f2 to be displayed in the expanded display region. Likewise, if a touch gesture on the folder f3 in FIG. 11A is determined, the display control section 103 expands, as shown in FIG. 11C, the display region of the icon B1 and allows, in addition to the second functional image mb1 and the three second functional images mb2 to mb4, the respective second functional images mb7, mb8 corresponding to the two files f7, f8 belonging to the folder f3 to be displayed in the expanded display region.

Third Embodiment

Next, a description will be given of a display device according to a third embodiment of the present invention. A display device 1 according to the third embodiment has an appearance and an internal configuration shown in FIGS. 1 and 2 like the first embodiment, but differs from that according to the first embodiment in the manner of performing a gesture on an icon.

Figure 12:
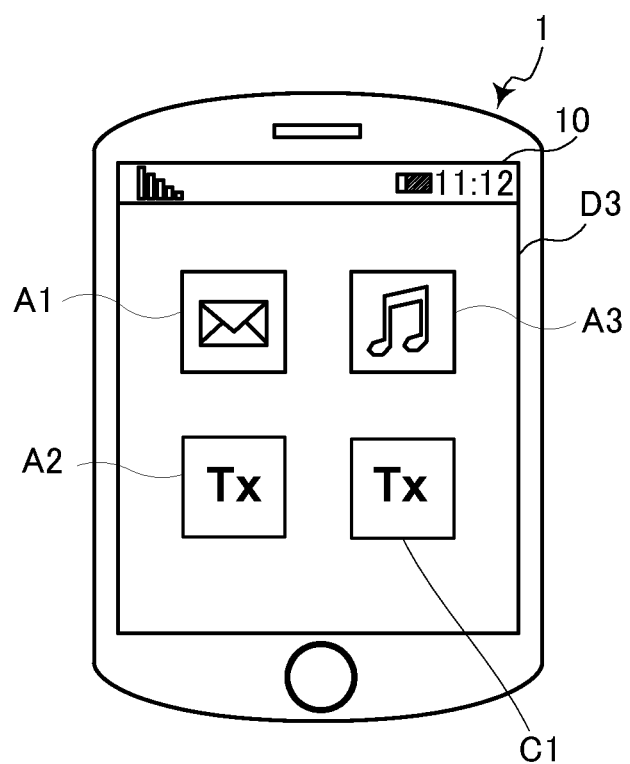
FIG. 12 is a view showing an operation screen of a display device according to a third embodiment.
Figure 13A:
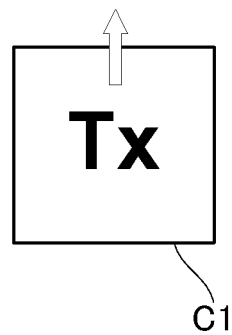
FIGS. 13A to 13F are views illustrating directions of operation of slide gestures on an icon in the third embodiment.
Figure 13D:
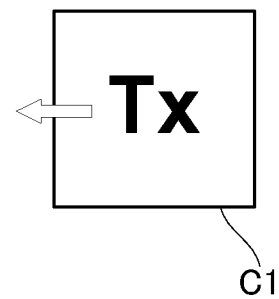
Figure 13B:
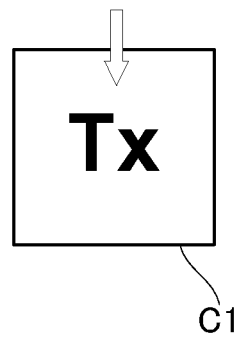
Figure 13E:
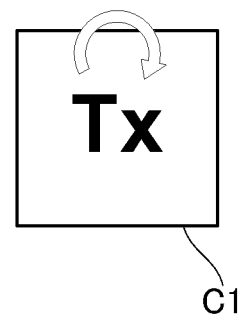
Figure 13C:
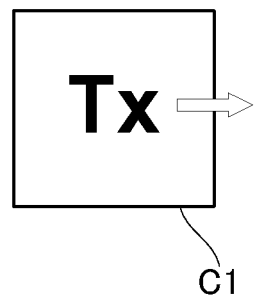
Figure 13F:
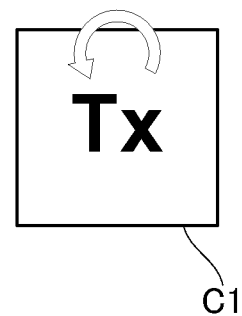

In the third embodiment, an operation screen D3 on which, for example, as shown in FIG. 12, a plurality of icons A1 to A3 and an icon C1 are arranged is displayed on the display section 10 of the display device 1. The icons A1 to A3 are associated with their respective functions and the functions are executed by respective touch gestures on the icons A1 to A3.

As for the icon C1, a function corresponding to the icon C1 is executed by a touch gesture thereon and, not only that, upon a slide gesture on the icon, the function corresponding to the icon is executed in association with a function corresponding to a direction of operation of the slide gesture. Thus, two functions can be executed in association with each other by a single slide gesture, which enables the operation to be simplified.

For example, as shown in FIGS. 13A to 13F, upward, downward, rightward, leftward, clockwise, counterclockwise directions and so on are previously set as directions of operation of a user's gesture on the icon C1 and respective functions are also set corresponding to these directions of operation. Then, when the direction of operation of a slide gesture on the icon C1 coincides with one of the upward, downward, rightward, leftward, clockwise, and counterclockwise directions, the function corresponding to the icon is executed in association with the function corresponding to the direction of operation of the slide gesture.

More specifically, assuming that the icon C1 is associated with a text file and the upward, downward, rightward, leftward, clockwise, and counterclockwise directions are associated with respective print settings, when a slide gesture is performed on the icon C1, the text of the text file corresponding to the icon C1 is printed based on the print setting corresponding to the direction of operation of the slide gesture. The respective print settings corresponding to the directions of operation include "2 in 1", "4 in 1", black-and-white printing, color printing, portrait mode, and landscape mode.

Figure 14:
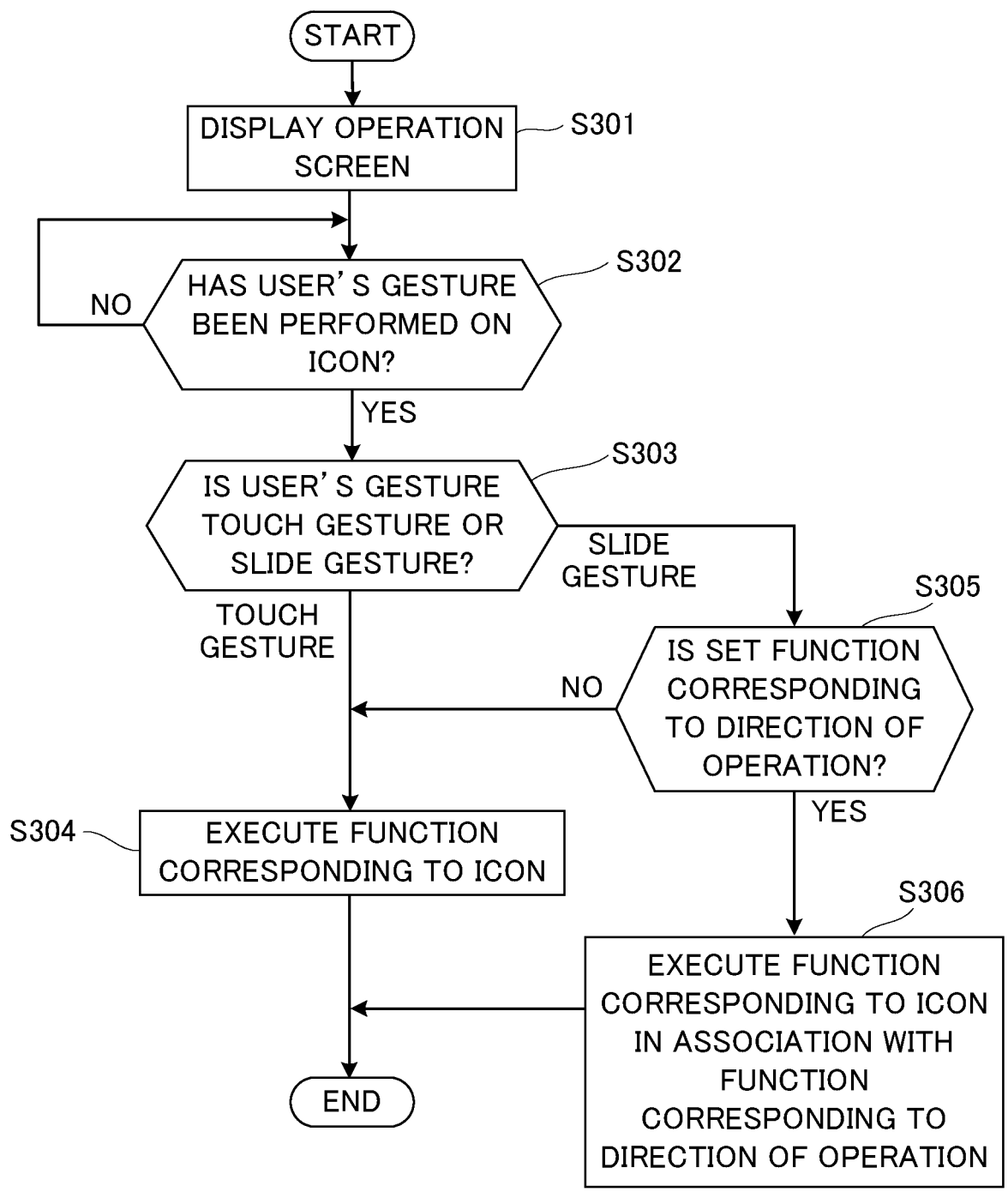
FIG. 14 is a flowchart showing a procedure for control of the display device according to the third embodiment based on a gesture performed on an icon.

Next, a description will be given of a procedure for control of the display device 1 according to the third embodiment based on a gesture performed on an icon, with reference to a flowchart shown in FIG. 14.

The display control section 103 first reads data on an operation screen stored in the storage section 40 and allows the display section 10 to display the operation screen D3 (step S301).

Then, when the gesture acceptance section 102 accepts a user's gesture on an icon placed on the operation screen D3 ("Yes" in step S302), it determines whether the user's gesture is a touch gesture or a slide gesture (step S303). For example, if the gesture acceptance section 102 determines that the user's gesture is a touch gesture ("Touch Gesture" in step S303), the control section 101 executes a function corresponding to the icon on which the touch gesture has been performed (step S304).

On the other hand, if the gesture acceptance section 102 determines that the user's gesture is a slide gesture ("Slide Gesture" in step S303), the control section 101 determines whether or not a function corresponding to the direction of operation of the slide gesture is set for the icon on which the user's gesture has been accepted (step S305). Then, if the control section 101 determines that the function corresponding to the direction of operation of the slide gesture is set ("Yes" in step S305), it executes the function corresponding to the icon on which the slide gesture has been performed, in association with the function corresponding to the direction of operation of the slide gesture (step S306).

For example, when a slide gesture is performed on the icon C1, a print driver is activated and instructed on the print setting corresponding to the direction of operation of the slide gesture. The print driver generates, based on the print setting corresponding to the direction of operation of the slide gesture, print data on the text of the text file corresponding to the icon C1 and transmits the print data from the communication section 30 via the network to a printer on the network. The printer receives the print data and prints a text represented by the print data on a recording paper sheet.

Even if the gesture acceptance section 102 determines that the user's gesture is a slide gesture ("Slide Gesture" in step S303), but if the control section 101 determines that no function corresponding to the direction of operation of the slide gesture is set ("No" in step S305), the function corresponding to the icon is executed (step S304), but no function corresponding to the direction of operation of the slide gesture is executed.

As thus far described, in the display device 1 according to the third embodiment of the present invention, when a user's gesture is performed on an icon on the operation screen D3, it is determined whether the user's gesture is a touch gesture or a slide gesture. In the case of a touch gesture, the function corresponding to the icon is executed. On the other hand, in the case of a slide gesture, it is determined whether or not a function corresponding to the direction of operation of the slide gesture is set. If no function corresponding to the direction of operation of the slide gesture is set, the function corresponding to the icon is executed but no function corresponding to the direction of operation of the slide gesture is executed. If a function corresponding to the direction of operation of the slide gesture is set, the function corresponding to the icon is executed in association with the function corresponding to the direction of operation of the slide gesture. Therefore, two functions can be executed in association with each other by a single slide gesture on an icon, so that the operation can be simplified to provide a novel operability to the user.

<Modification 3-1>

Although in the third embodiment a single direction is determined as the direction of operation of a slide gesture on the icon C1 and the function corresponding to this direction of operation is executed, it is possible to simultaneously determine a plurality of directions and execute the respective functions corresponding to these directions in combination.

For example, assuming that "2 in 1", "4 in 1", black-and-white printing, color printing, portrait mode, and landscape mode are set as print settings corresponding to the upward, downward, rightward, leftward, clockwise, and counter-clockwise directions, respectively, when, for example, an upward slide gesture is performed on the icon C1 and a rightward slide gesture is subsequently performed on the icon C1, "2 in 1" printing and black-and-white printing are executed in combination. For another example, when a leftward slide gesture is performed on the icon C1 and a clockwise slide gesture is subsequently performed on the icon C1, color printing and printing in portrait mode are executed in combination.

Fourth Embodiment

In a fourth embodiment, the security of icons can be improved. Specifically, an icon can be set so that when a touch gesture is performed on a preset operating region within the display region of the icon, the function associated with the icon is executed, but that when a touch gesture is performed on the other region within the display region of the icon than the operating region, the function associated with the icon is not executed. Furthermore, the operating region within the display region of the icon is arbitrarily set by the user of the display device 1 and the operating region is not displayed after the setting. Therefore, even if a person different from the user of the display device 1 operates the display device 1, the function of the icon cannot readily be executed, so that the security of the icon can be improved.

For example, within the display region of an icon A4 displayed on the operation screen D1 of the display section 10 shown in FIGS. 17A to 17C described hereinafter, an operating region ma smaller than the display region is set. This operating region ma is previously set by the user of the display device 1 and, after the setting, is not displayed and therefore cannot be seen.

If the gesture acceptance section 102 determines, based on a detection signal output from the touch panel 20, that a touch gesture has been performed on the operating region ma within the display region of the icon A4, the gesture acceptance section 102 accepts the touch gesture and outputs a control signal corresponding to this touch gesture to the control section 101. The control section 101 executes an Internet browser function associated with the icon A4 including the operating region ma on which the touch gesture has been performed. On the other hand, if the gesture acceptance section 102 determines, based on a detection signal output from the touch panel 20, that a touch gesture has been performed on the other region within the display region of the icon A4 different from the operating region ma, the gesture acceptance section 102 outputs no control signal to the control section 101. Therefore, the Internet browser function is not executed.

Figure 15:
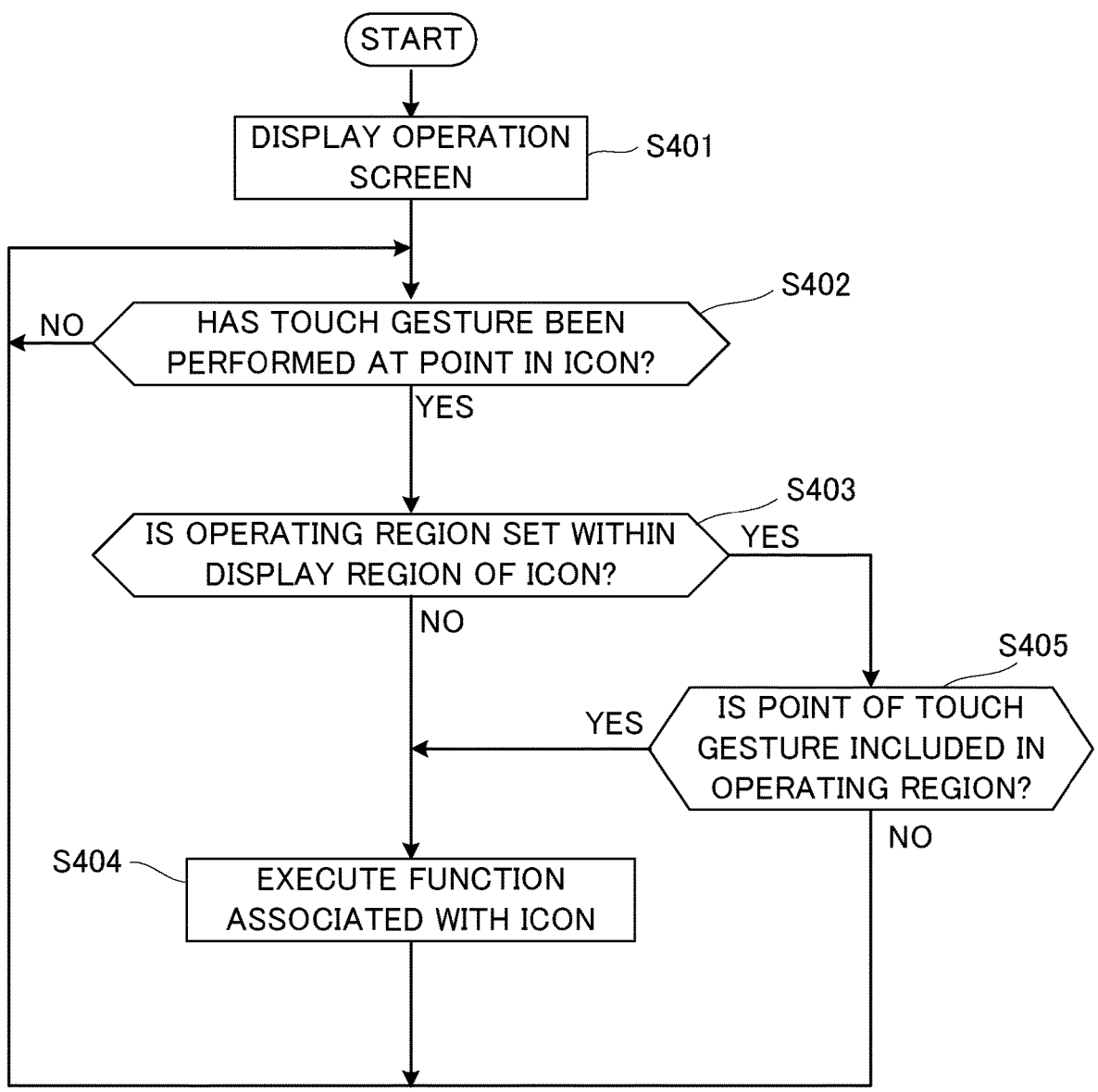
FIG. 15 is a flowchart showing an operation for selecting an icon on a display device according to a fourth embodiment.

Next, a description will be given of an operation of the display device 1 according to the fourth embodiment. FIG. 15 is a flowchart showing an operation for selecting an icon on the display device 1.

The display control section 103 first reads data on an operation screen stored in the storage section 40 and allows the display section 10 to display the operation screen D1 (step S401).

Then, when the gesture acceptance section 102 accepts a touch gesture on an icon placed on the operation screen D1 ("Yes" in step S402), it determines whether or not an operating region ma is set within the display region of the icon on which the touch gesture has been performed (step S403). For example, if the gesture acceptance section 102 determines that no operating region ma is set within the display region of the icon on which the touch gesture has been performed ("No" in step S403), the control section 101 executes a function associated with the icon on which the touch gesture has been performed (step S404).

On the other hand, if the gesture acceptance section 102 determines that an operating region ma is set within the display region of the icon on which the touch gesture has been performed ("Yes" in step S403), it further determines whether or not the point of the touch gesture is included in the operating region ma within the display region of the icon (step S405). Then, if the gesture acceptance section 102 determines that the point of the touch gesture is included in the operating region ma within the display region of the icon ("Yes" in step S405), the control section 101 executes the function associated with the icon on which the touch gesture has been performed (step S404). On the other hand, if the gesture acceptance section 102 determines that the point of the touch gesture is not included in the operating region ma within the display region of the icon ("No" in step S405), the function associated with the icon on which the touch gesture has been performed is not executed.

For example, if the point of the touch gesture is included in the operating region ma within the display region of the icon A4 ("Yes" in step S405), the Internet browser function associated with the icon A4 is executed (step S404). On the other hand, if the point of the touch gesture is not included in the operating region ma within the display region of the icon A4 ("No" in step S405), the Internet browser function associated with the icon A4 is not executed.

Thereafter, the processing of steps S402 to S405 is cyclically repeated and, upon a touch gesture on an icon on the operation screen D1, it is determined whether or not an operating region ma is set within the display region of the icon on which the touch gesture has been performed. If no operating region ma is set within the display region of the icon on which the touch gesture has been performed or if an operating region is set within the display region of the icon on which the touch gesture has been performed and the point of the touch gesture is included in the operating region ma within the display region of the icon, the function associated with the icon on which the touch gesture has been performed is executed.

As thus far described, in the display device 1 according to the fourth embodiment of the present invention, if an operating region ma is set within the display region of an icon, the function associated with the icon is executed only when the point of a touch gesture on the icon is included in the operating region ma. Therefore, even if a person not aware of the fact that the operating region ma is set operates the display device 1, the function of the icon cannot readily be executed, so that the security of the icon can be improved and a novel operability can be provided to the user.

<Modification 4-1>

Although in the fourth embodiment the function associated with an icon is not executed if the point of a touch gesture on the icon is not included in the operating region ma within the display region of the icon, preset dummy data may be displayed on the screen of the display section 10 instead.

For example, dummy data is previously set in association with the icon A4 and stored in the storage section 40 or the like. Then, if a touch gesture on the icon A4 has been accepted by the gesture acceptance section 102 but the point of the touch gesture is determined not to be included in the operating region ma within the display region of the icon A4, the display control section 103 reads the dummy data associated with the icon A4 from the storage section 40 and allows the display section 10 to display the dummy data on the screen.

<Modification 4-2>

Figure 16:
FIG. 16 is a view conceptually showing an operating region location table in which the locations of an operating region are associated with respective time zones in a modification of the fourth embodiment.

Alternatively, the display control section 103 may change the location of the operating region ma within the display region of an icon according to the time of day. For this purpose, an operating region location table Dt1 as shown in FIG. 16 is previously created and stored in the storage section 40 or the like. In this operating region location table Dt1, an upper portion of the display region of the icon is set as the location of the operating region ma corresponding to a time zone from AM 7:00 to AM 9:00, a left portion of the display region of the icon is set as the location of the operating region ma corresponding to a time zone from AM 9:00 to PM 5:00, and a lower portion of the display region of the icon is set as the location of the operating region ma corresponding to a time zone from PM 5:00 to AM 7:00.

The display control section 103 acquires a current time of day being timed on the display device 1, compares the current time of day with each time zone in the operating region location table Dt1 to select the location within the display region of the icon where the time zone including the current time of day is set, and sets the operating region ma at the selected location within the display region of the icon.

Figure 17A:
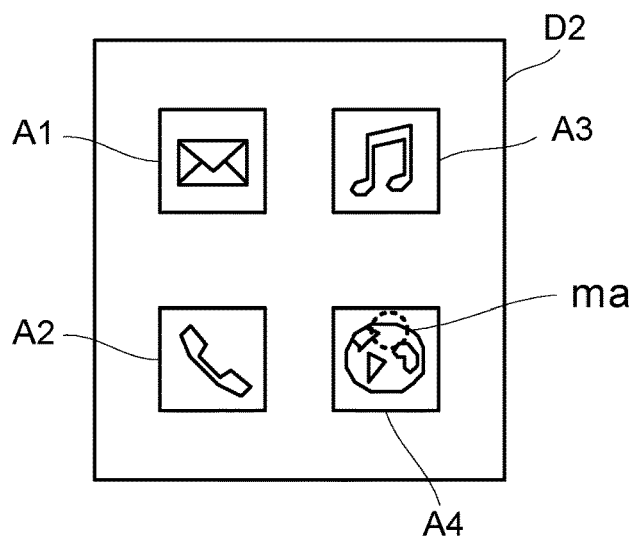
FIGS. 17A to 17C are views showing variations in the location of the operating region in the display device when the operating region location table is used.
Figure 17B:
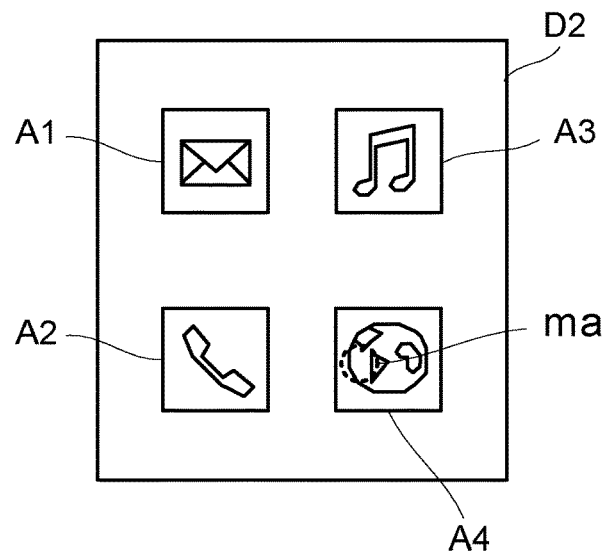
Figure 17C:
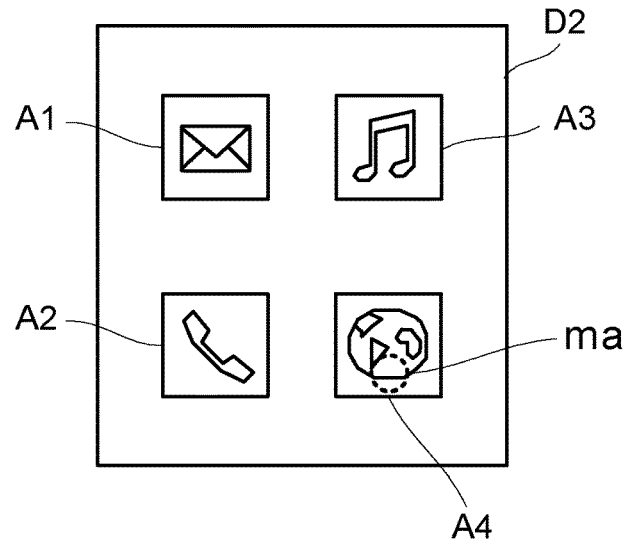

When the operating region location table Dt1 as shown in FIG. 16 is set, in a time zone from AM 7:00 to AM 9:00, the operating region ma is positioned at an upper portion of the display region of an icon as shown in FIG. 17A. In a time zone from AM 9:00 to PM 5:00, the operating region ma is positioned at a left portion of the display region of the icon as shown in FIG. 17B. In a time zone from PM 5:00 to AM 7:00, the operating region ma is positioned at a lower portion of the display region of the icon as shown in FIG. 17C.

<Modification 4-3>

Figure 18:
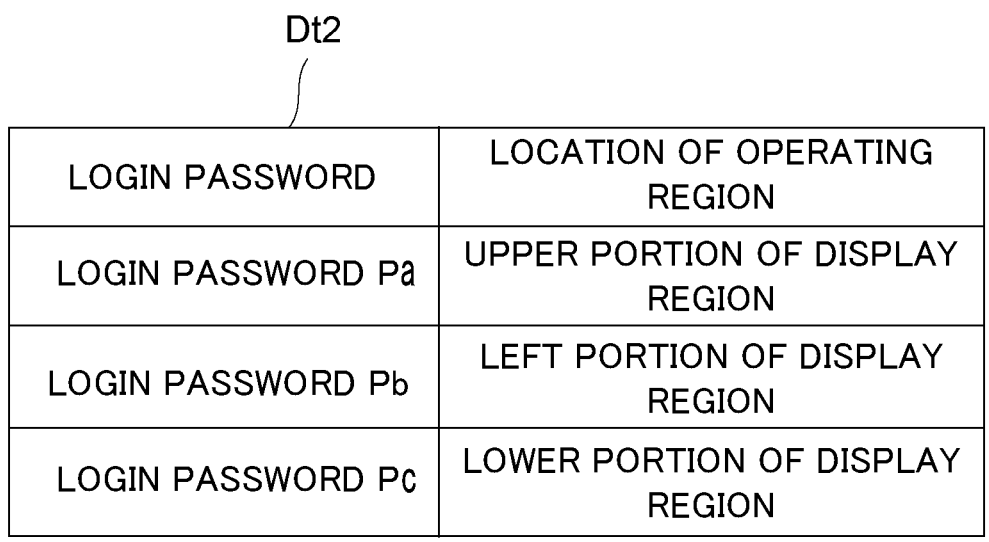
FIG. 18 is a view conceptually showing an operating region location table in which the locations of an operating region are associated with respective login passwords in a modification of the fourth embodiment.
Figure 19A:
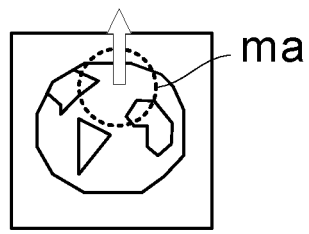
FIGS. 19A to 19F are views illustrating directions of user's gestures on the operating region in a modification of the fourth embodiment.
Figure 19D:
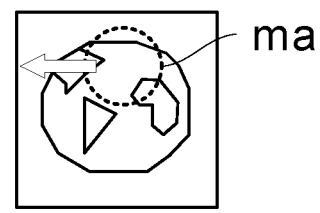
Figure 19B:
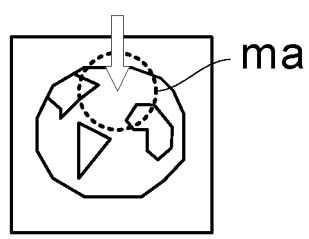
Figure 19E:
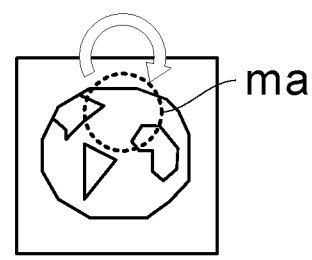
Figure 19C:
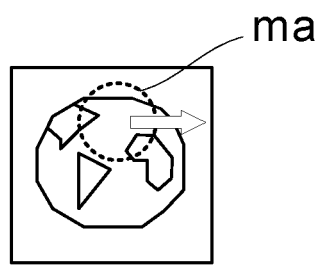
Figure 19F:
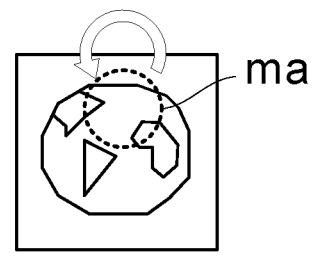

Furthermore, the display control section 103 may change the location of the operating region ma within the display region of an icon according to the user logging in in order to use the display device 1. For this purpose, an operating region location table Dt2 as shown in FIG. 18 is previously created and stored in the storage section 40 or the like. In this operating region location table Dt2, an upper portion of the display region of the icon is set as the location of the operating region ma corresponding to a login password Pa for a user A, a left portion of the display region of the icon is set as the location of the operating region ma corresponding to a login password Pb for a user B, and a lower portion of the display region of the icon is set as the location of the operating region ma corresponding to a login password Pc for a user C.

Now assume that a keyboard or the like is displayed on the screen of the display section 10 and a login password has been input by touch gestures. In this case, when the login password is input through the gesture acceptance section 102 and the input login password coincides with one of the login passwords Pa, Pb, and Pc in the operating region location table Dt2, the control section 101 turns the display device 1 into an enabled operational state. Then, the display control section 103 refers to the operating region location table Dt2, selects the location within the display region of an icon corresponding to the input login password, and sets the operating region ma at the selected location within the display region of the icon.

When an operating region location table Dt2 as shown in FIG. 18 is set, upon input of the login password Pa for the user A, the operating region ma is positioned at an upper portion of the display region of an icon. Upon input of the login password Pb for the user B, the operating region ma is positioned at a left portion of the display region of the icon. Upon input of the login password Pc for the user C, the operating region ma is positioned at a lower portion of the display region of the icon.

<Modification 4-4>

Moreover, the gesture acceptance section 102 may be configured to accept a touch gesture performed in a preset operation procedure for the operating region ma within the display region of an icon, but not to accept a touch gesture performed differently from the operation procedure for the operating region ma.

For example, when a touch gesture on the operating region ma is repeated a specified number of times within a specified period of time, the gesture acceptance section 102 accepts the touch gesture. When a touch gesture on the operating region ma is not repeated the specified number of times (predetermined number of times) within the specified period of time, the gesture acceptance section 102 does not accept the touch gesture.

Alternatively, when a user's gesture on the operating region ma is a slide gesture in a specified direction (predetermined direction), the gesture acceptance section 102 accepts the user's gesture. When the user's gesture is not in the specified direction, the gesture acceptance section 102 does not accept the user's gesture. More specifically, as shown in FIGS. 19A to 19F, an upward, downward, rightward, leftward, clockwise, counterclockwise direction or the like is previously set as a specified direction for a user's gesture on the operating region ma. Then, when the direction of a user's gesture on the operating region ma coincides with the specified direction, the user's gesture is accepted. When the direction of the user's gesture does not coincide with the specified direction, the user's gesture is not accepted.

Fifth Embodiment

A description will be given of a display device according to a fifth embodiment of the present invention. A display device 1 according to the fifth embodiment is different from that according to the fourth embodiment in the number of operating regions ma set within the display region of an icon.

Figure 20:
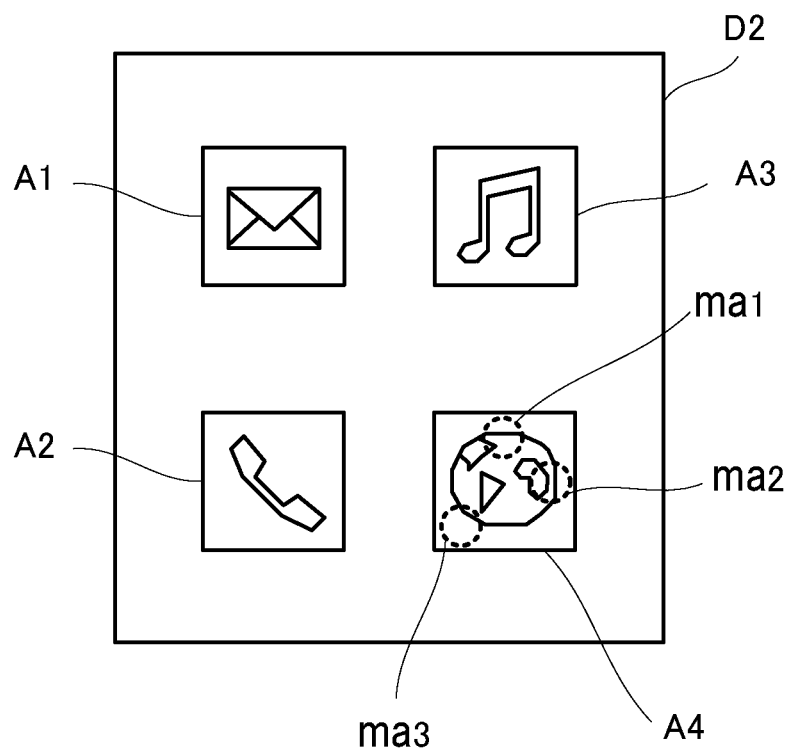
FIG. 20 is a view illustrating an operation screen of a display device according to a fifth embodiment.

In the fifth embodiment, for example, as shown in FIG. 20, assuming that the icon A4 is displayed on the operation screen D2 of the display section 10, three operating regions ma1, ma2, and ma3 are set in a hidden state within the display region of the icon A4.

These operating regions ma1, ma2, and ma3 are set at respective arbitrary locations within the display region of the icon A4 and in desired sizes by repeating the procedure shown in FIGS. 3A to 3C. Furthermore, the number of operating regions within the display region of one icon can be arbitrarily set.

Figure 21:
FIG. 21 is a view conceptually showing an operation procedure table in which operating regions are associated with respective operation procedures in the display device according to the fifth embodiment.

For the operating regions ma1, ma2, ma3 within the display region of such an icon A4, an operation procedure for a touch gesture is previously set. For example, the operation procedure is set for each of the operating regions ma1, ma2, and ma3 and it is to perform a touch gesture a specified number of times repeatedly on the operating region within a specified period of time. For this purpose, an operation procedure table Dt3 as shown in FIG. 21 is previously created and stored in the storage section 40 or the like. In this operation procedure table Dt3, a touch gesture performed once within a specified period of time T is set corresponding to the operating region ma1, a touch gesture performed twice within the specified period of time T is set corresponding to the operating region ma2, and a touch gesture performed three times within the specified period of time T is set corresponding to the operating region ma3.

Under these conditions, when a touch gesture is performed on one of the operating regions ma1 to ma3 within the display region of the icon A4, the gesture acceptance section 102 determines, based on a detection signal output from the touch panel 20, whether or not the touch gesture has been performed in the operation procedure appropriate to the touched operating region, with reference to the operation procedure table Dt3. If determining that the touch gesture has been performed in the operation procedure appropriate to the operating region, the gesture acceptance section 102 accepts the touch gesture and outputs a control signal corresponding to the touch gesture to the control section 101. For example, when a touch gesture is performed once on the operating region ma1 within the specified period of time T, the touch gesture is accepted. Likewise, when a touch gesture is performed twice on the operating region ma2 within the specified period of time T or when a touch gesture is performed three times on the operating region ma3 within the specified period of time, the touch gesture is accepted. Then, the display control section 10 executes the Internet browser function associated with the icon A4.

On the other hand, if the gesture acceptance section 102 determines, based on a detection signal output from the touch panel 20, that the touch gesture has been performed on another region within the display region of the icon A4 different from the operating regions ma1 ma3 or that the touch gesture has been performed on one of the operating regions ma1 ma3 but not performed in the operation procedure appropriate to the touched operating region, the gesture acceptance section 102 does not accept the touch gesture and does not output a control signal to the control section 101. Therefore, the Internet browser function is not executed.

Figure 22:
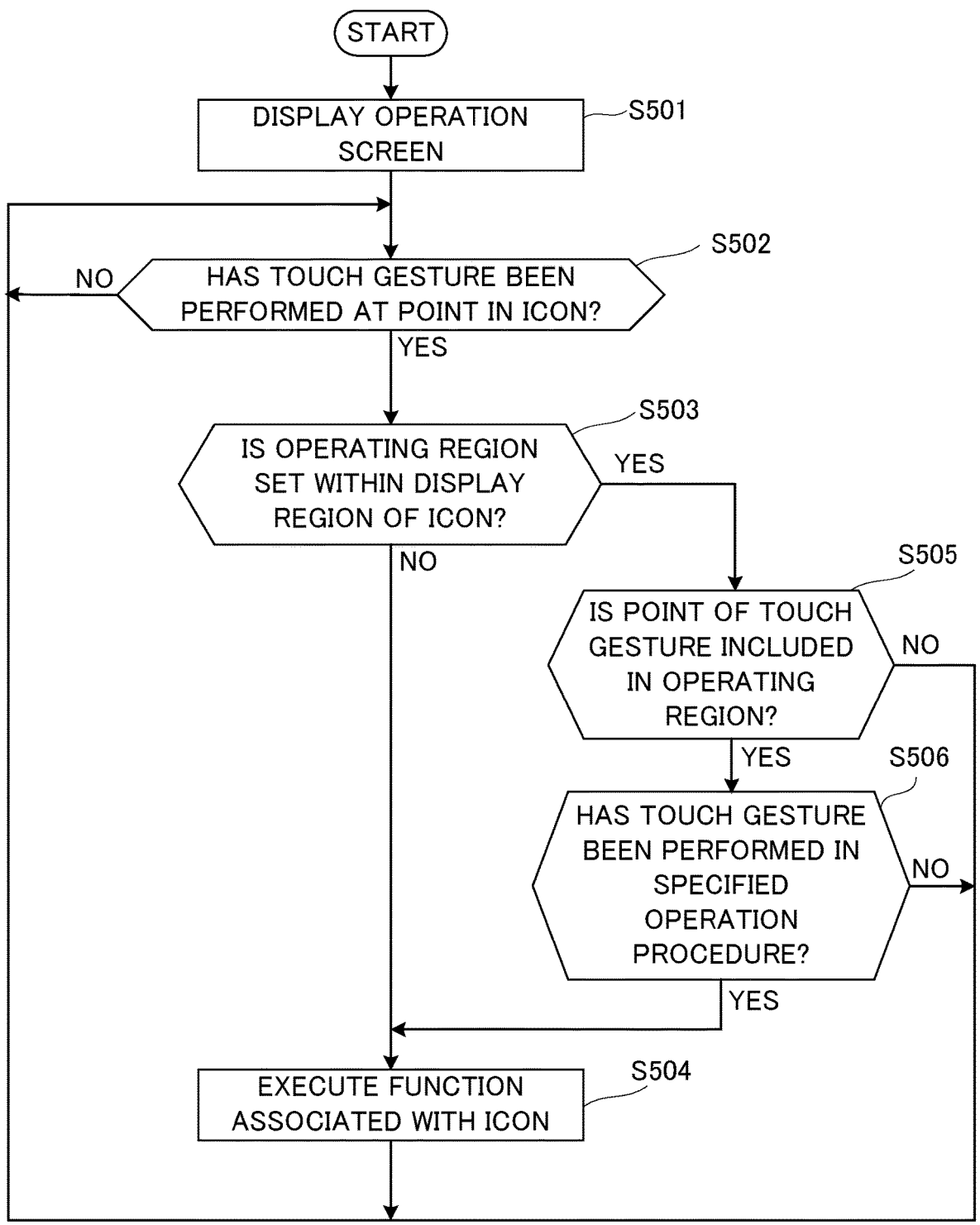
FIG. 22 is a flowchart showing an operation for selecting an icon on the display device according to the fifth embodiment.

Next, a description will be given of an operation of the display device 1 according to the fifth embodiment. FIG. 22 is a flowchart showing an operation for selecting an icon on the display device 1.

The display control section 103 first reads data on an operation screen stored in the storage section 40 and allows the display section 10 to display the operation screen D2 (step S501).

Then, when the gesture acceptance section 102 accepts a touch gesture on an icon placed on the operation screen D2 ("Yes" in step S502), it determines whether or not any operating region is set within the display region of the icon on which the touch gesture has been performed (step S503). For example, if the gesture acceptance section 102 determines that no operating region is set within the display region of the icon on which the touch gesture has been performed ("No" in step S503), the control section 101 executes a function associated with the icon on which the touch gesture has been performed (step S504).

On the other hand, if the gesture acceptance section 102 determines that any operating region is set within the display region of the icon on which the touch gesture has been performed ("Yes" in step S503), it further determines whether or not the point of the touch gesture is included in the operating region within the display region of the icon (step S505). If determining that the point of the touch gesture is included in the operating region ma within the display region of the icon ("Yes" in step S505), the gesture acceptance section 102 determines whether or not the touch gesture has been performed in the operation procedure appropriate to the touched operating region (step S506).

If, then, the gesture acceptance section 102 determines that the touch gesture has been performed in the operation procedure appropriate to the touched operating region ("Yes" in step S506), the control section 101 executes the function associated with the icon on which the touch gesture has been performed (step S504).

If the gesture acceptance section 102 determines that the point of touch gesture is not included in the operating region within the display region of the icon ("No" in step S505) or if the gesture acceptance section 102 determines that the point of the touch gesture is included in the operating region within the display region of the icon ("Yes" in step S505) but determines that the touch gesture has not been performed in the operation procedure appropriate to the touched operating region ("No" in step S506), the function associated with the icon on which the touch gesture has been performed is not executed.

Thereafter, the processing of steps S502 to S506 is cyclically repeated and, upon a touch gesture on an icon on the operation screen D2, it is determined whether or not any operating region is set within the display region of the icon on which the touch gesture has been performed. If no operating region is set within the display region of the icon on which the touch gesture has been performed, the function associated with the icon on which the touch gesture has been performed is executed. Also, if any operating region is set within the display region of the icon on which the touch gesture has been performed, the point of the touch gesture is included in the operating region within the display region of the icon, and the touch gesture has been performed in the operation procedure appropriate to the touched operating region, then the function associated with the icon on which the touch gesture has been performed is executed.

As thus far described, in the display device 1 according to the fifth embodiment of the present invention, if a plurality of operating regions ma1 to ma3 are set within the display region of an icon, the function associated with the icon is executed only when the point of a touch gesture on the icon is included in one of the operating regions and the touch gesture has been performed in the operation procedure appropriate to the touched operating region. Therefore, even if a person not aware of the fact that the operating regions are set operates the display device 1, the function of the icon cannot readily be executed, so that the security of the icon can be improved and a novel operability can be provided to the user.

<Modification 5-1>

Although in the fifth embodiment a touch gesture performed a specified number of times repeatedly on an operating region within a specified period of time is illustrated as an operation procedure for the operating region, other operation procedures may be applied. For example, the order of touch gestures on the operating regions within the display region of an icon may be set as the operation procedure for the operating regions. More specifically, an order of touch gestures on the operating regions ma1, ma2, and ma3 within the display region of the icon A4 shown in FIG. 9 is previously set. If the operating regions ma1, ma2, ma3 have been sequentially touched in the above order, the function associated with the icon on which the touch gesture has been performed is executed. If the operating regions ma1, ma2, ma3 have not been touched in the above order, the function associated with the icon on which the touch gesture has been performed is not executed.

In addition, when each of the operating regions ma1, ma2, and ma3 has a turn to be touched, it may be determined, like the fifth embodiment, whether or not a touch gesture has been performed a specified number of times repeatedly on the operating region within a specified period of time. In this case, if touch gestures have been sequentially performed on the operating regions ma1, ma2, ma3 in their turns and, for each of the operating regions ma1, ma2, and ma3, the touch gesture has been performed the specified number of times repeatedly on the operating region within the specified period of time, then the function associated with the icon on which the touch gesture has been performed is executed.

Furthermore, when each of the operating regions ma1, ma2, ma3 has a turn to be touched, it may be determined whether or not the direction of a user's gesture on the operating region is a specified direction. In this case, if user's gestures have been sequentially performed on the operating regions ma1, ma2, ma3 in their turns and, for each of the operating regions ma1, ma2, and ma3, the direction of the user's gesture on the operating region is the specified direction, then the function associated with the icon on which the user's gesture has been performed is executed. Examples of the specified direction for the user's gesture include upward, downward, rightward, leftward, clockwise, and counterclockwise directions.

<Modification 5-2>

Also in the fifth embodiment, like the above-described Modification 4-1 of the fourth embodiment, instead of not executing the function associated with an icon, preset dummy data may be displayed on the screen of the display section 10.

Furthermore, like the above-described Modifications 4-2 and 4-3 of the fourth embodiment, for each of operating regions within the display region of an icon, the location of the operating region within the display region of the icon may be changed according to the time of day or the user logging in.

Sixth Embodiment

In a sixth embodiment, instead of the functional icon A4 (image) placed at a specified location on the operation screen D1 of the display section 10, the display control section 103 selectively displays one of other functional icons A5, A6, and A7 (images) at the specified location.

Specifically, for each of the functional icons A4, A5, A6, and A7, the display time zone for the icon is set. The display control section 103 acquires a current time of day being timed on the display device 1, compares the current time of day with the display time zone for each of the functional icons A4 to A7 to select the icon for which the display time zone including the current time of day is set, and displays the selected icon at a specified location on the operation screen D1. Therefore, according to the time of day, one of the functional icons A4, A5, A6, and A7 is selectively displayed at the specified location on the operation screen D1.

Figure 23:
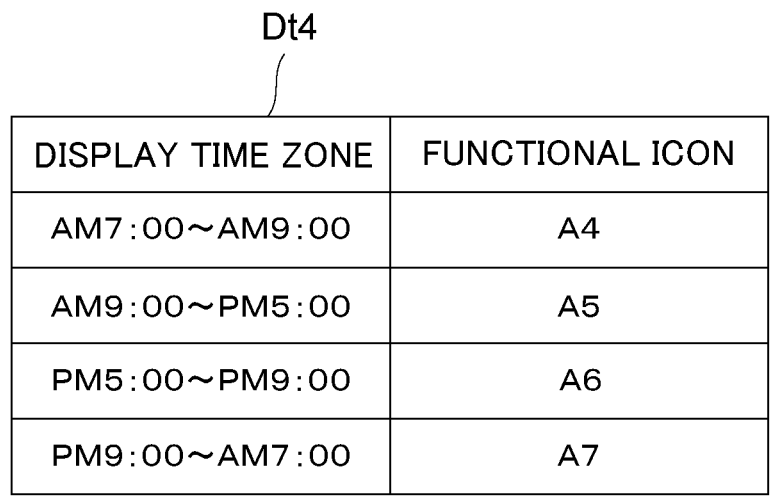
FIG. 23 is a view conceptually showing a display time zone table in which functional icons are associated with respective display time zones in a display device according to a sixth embodiment.

FIG. 23 conceptually shows a display time zone table Dt4 in which the functional icons A4, A5, A6, and A7 are associated with their respective display time zones. In this display time zone table Dt4, the functional icon A4 is set corresponding to a display time zone from AM 7:00 to AM 9:00, the functional icon A5 is set corresponding to a display time zone AM 9:00 to PM 5:00, the functional icon A6 is set corresponding to a display time zone from PM 5:00 to PM 9:00, and the functional icon A7 is set corresponding to a display time zone from PM 9:00 to AM 7:00.

Figure 24A:
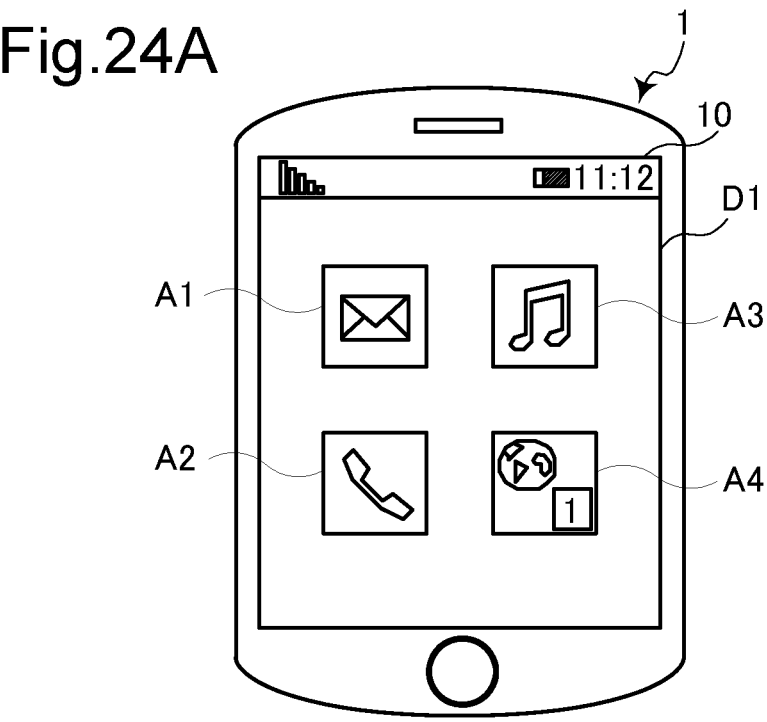
FIGS. 24A and 24B are views showing a change of an operation screen according to the current time of day in the display device according to the sixth embodiment.
Figure 24B:
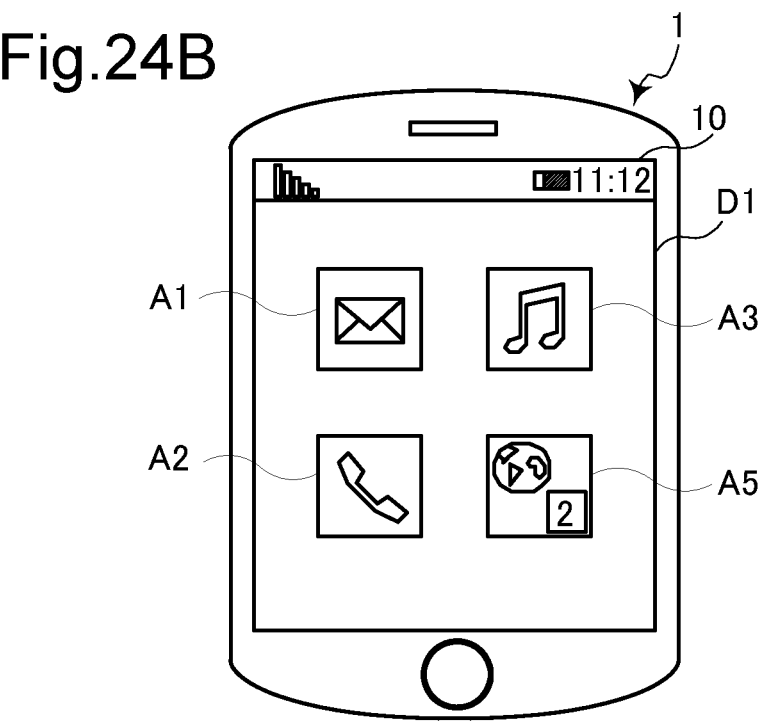

In this case, in the display time zone from AM 7:00 to AM 9:00, the functional icon A4 is displayed at the specified location on the operation screen D1 as shown in FIG. 24A, and in the display time zone from AM 9:00 to PM 5:00 the functional icon A5 is displayed at the specified location on the operation screen D1 as shown in FIG. 24B. Likewise, in the display time zone from PM 5:00 to PM 9:00, the functional icon A6 is displayed at the specified location on the operation screen D1, and in the display time zone from PM 9:00 to AM 7:00 the functional icon A7 is displayed at the specified location on the operation screen D1.

Furthermore, the functional icons A4, A5, A6, and A7 are associated with their respective Internet browser functions (Internet browser programs). In these Internet browser functions, sites on the Net to be first accessed upon execution of the Internet browser functions are individually set. Therefore, the site to be first accessed varies depending on which of the functional icons A4, A5, A6, and A7 has been selected. Specifically, when, with any one of the functional icons A4, A5, A6, A7 displayed at the specified location on the operation screen D1, the user performs a touch gesture on the icon located at the specified location, the gesture acceptance section 102 accepts the touch gesture on the icon located at the specified location. Then, the control section 101 executes the Internet browser function associated with the icon located at the specified location where the touch gesture has been performed. According to the execution of the Internet browser function, the communication control section 104 first accesses, through the communication section 30, the site on the Net set by the Internet browser function and receives data of the site and the display control section 103 then allows the display section 10 to display the first site on the screen. Therefore, when a touch gesture is performed on the icon displayed at the specified location, the site to be first displayed on the screen of the display section 10 is different according to the time of day.

For example, the setting is such that when a touch gesture is performed on the functional icon A4 corresponding to the display time zone from AM 7:00 to AM 9:00, a site for weather forecast is first displayed, that when a touch gesture is performed on the functional icon A5 corresponding to the display time zone from AM 9:00 to PM 5:00, a site frequently used for work is first displayed, that when a touch gesture is performed on the functional icon A6 corresponding to the display time zone from PM 5:00 to PM 9:00, a site for news is first displayed, and that when a touch gesture is performed on the functional icon A7 corresponding to the display time zone from PM 9:00 to AM 7:00, a site for pleasure is first displayed. Therefore, by previously appropriately setting the display time zone table Dt4 shown in FIG. 23, the user can immediately browse a desired site according to the time zone.

Not only the time of day but also the day of the week and/or the date may be set as the display time zone. Furthermore, the number of icons to be selectively displayed at specified locations on the operation screen D1 may be increased or decreased. Moreover, the function to be associated with each icon is not limited to an Internet browser function but a different function may be associated with the icon.

Figure 25:
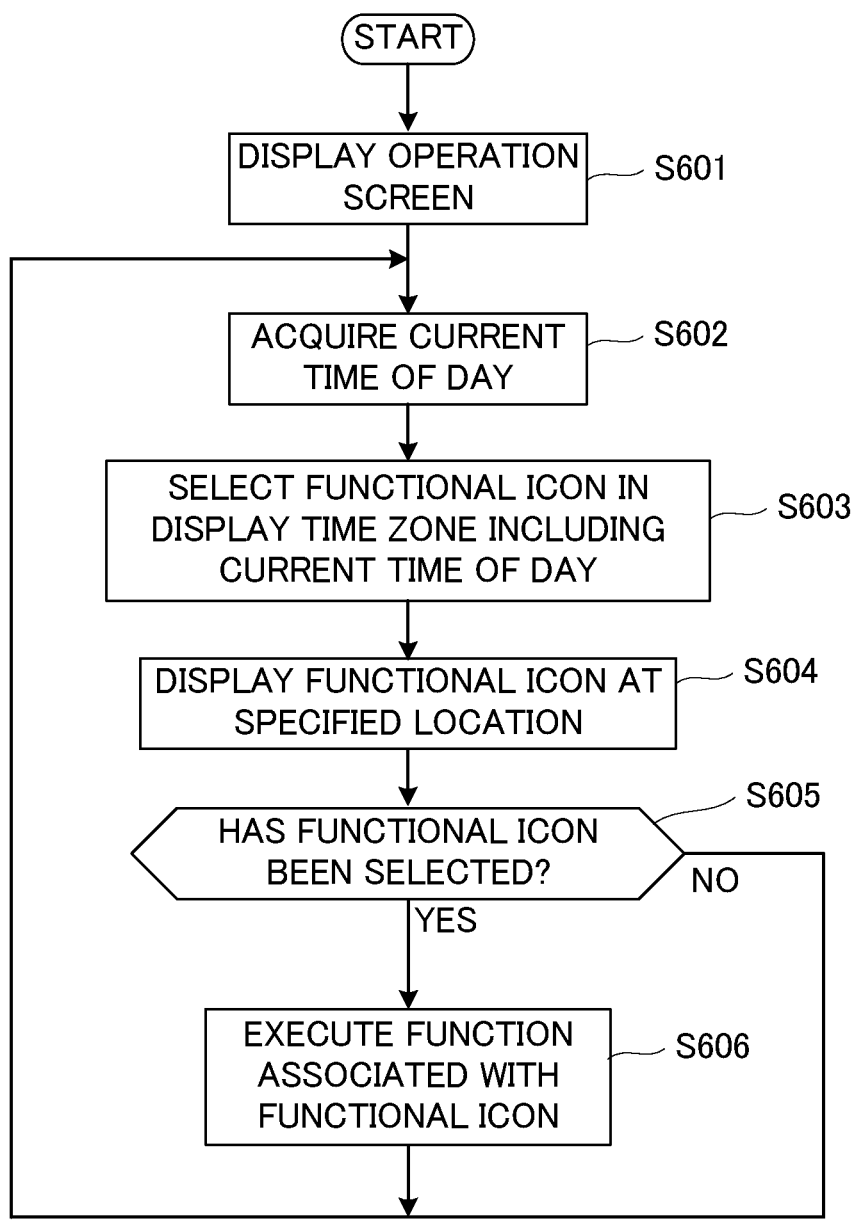
FIG. 25 is a flowchart showing processing for a display control of the display device according to the sixth embodiment.

Next, a description will be given of an operation of the display device 1 according to the sixth embodiment. FIG. 25 is a flowchart showing processing for changing the functional icon on the display device 1.

The display control section 103 first reads data on an operation screen stored in the storage section 40 and allows the display section 10 to display the operation screen D1 (step S601). In doing so, the display control section 103 acquires a current time of day being timed on the display device 1 (step S602), compares the current time of day with the display time zone for each of the functional icons A4 to A7 in the display time zone table Dt4 to select the icon for which the display time zone including the current time of day is set (step S603), and allows the display section 10 to display the icon at a specified location on the operation screen D1 (step S604).

Then, when, with the above operation screen D1 displayed on the display section 10, the gesture acceptance section 102 accepts a touch gesture on an icon placed on the operation screen ("Yes" in step S605), the control section 101 executes the function associated with the icon on which the touch gesture has been performed (step S606).

For example, when in the operation screen D1 as shown in FIG. 24A the gesture acceptance section 102 accepts a touch gesture for selecting the functional icon A1, the control section 101 executes the mail function associated with the functional icon A1. For another example, when the gesture acceptance section 102 accepts a touch gesture for selecting the functional icon A4, the control section 101 executes the Internet browser function associated with the functional icon A4. Thus, a site set by this Internet browser function is first accessed and the display control section 103 allows the display section 10 to display the first accessed site on the screen.

For still another example, when, with one of the other functional icons A5 to A7 displayed at the specified location on the operation screen D1, a user's gesture for selecting the one functional icon A5 to A7 is accepted, the Internet browser function associated with the icon on which the user's gesture has been accepted is executed, a site set by this Internet browser function is first accessed, and the first accessed site is displayed on the screen of the display section 10.

Thereafter, the processing of steps S602 to S606 is cyclically repeated, one of the functional icons A4 to A7 for which the display time zone including the current time of day is set is displayed at the specified location on the operation screen D1, and, upon selection of one functional icon on the operation screen D1, the function associated with the selected functional icon is executed.

As thus far described, in the display device 1 according to the sixth embodiment of the present invention, the functional icon A4 to A7 is selectively displayed according to the current time of day or the like, so that the usability for the user can be improved and a novel operability can be provided to the user.

Seventh Embodiment

Next, a description will be given of a display device according to a seventh embodiment of the present invention. A display device 10 according to the seventh embodiment is different from that according to the sixth embodiment in how the display control section 103 performs the display control of the operation screen of the display section 10 and in the display manner of the operation screen.

Figure 26:
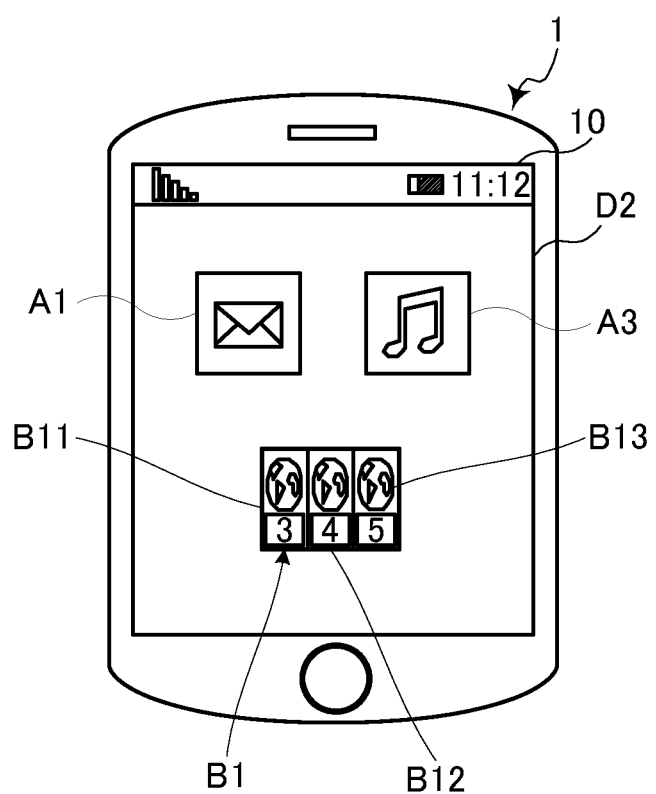
FIG. 26 is a view showing an example of an operation screen of a display device according to a seventh embodiment.

In the seventh embodiment, an operation screen D2 on which, for example, as shown in FIG. 26, a plurality of functional icons A1 to A3 and a synthetic icon B1 are arranged is displayed on the display section 10 of the display device 1. The functional icons A1 to A3 are associated with their respective functions. The synthetic icon B1 is an icon synthesized from a plurality of functional icons B11, B12, and B13 and these functional icons B11, B12, and B13 are associated with their respective functions. For example, the functional icons B11, B12, B13 are associated with their respective Internet browser functions. In these Internet browser functions, sites on the Net to be first accessed upon execution of the Internet browser functions are individually set. For example, when a touch gesture is performed on the functional icon B11, a site for weather forecast is first displayed. When a touch gesture is performed on the functional icon B12, a site frequently used for work is first displayed. When a touch gesture is performed on the functional icon B13, a site for pleasure is first displayed.

The synthetic icon B1 obtained by synthesizing such functional icons B11, B12, B13 is created in the following procedure.

Figure 27A:
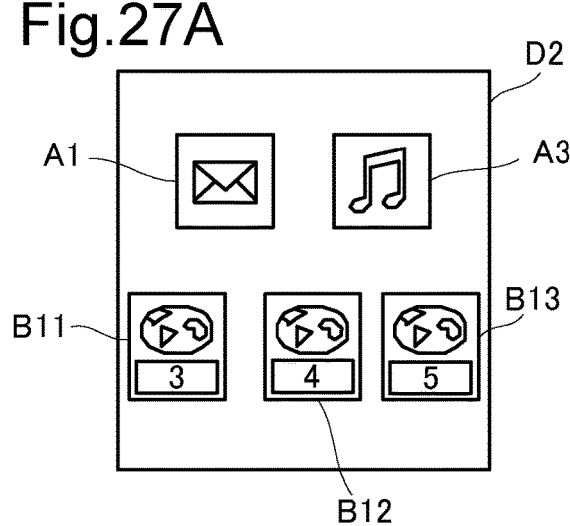
FIGS. 27A to 27E are views showing a procedure for creating a synthetic icon on the operation screen of the display device according to the seventh embodiment.
Figure 27D:
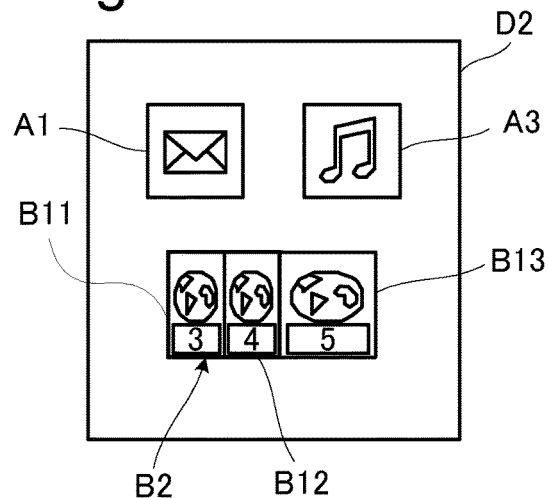
Figure 27B:
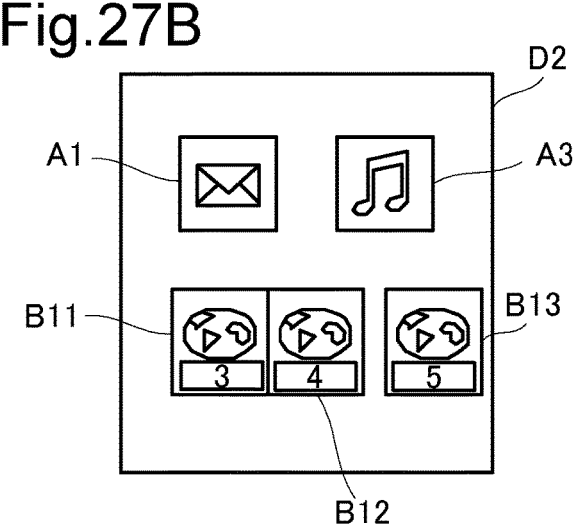
Figure 27E:
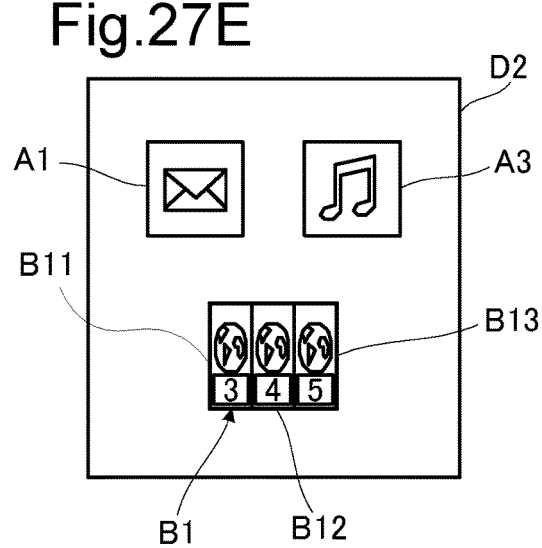
Figure 27C:
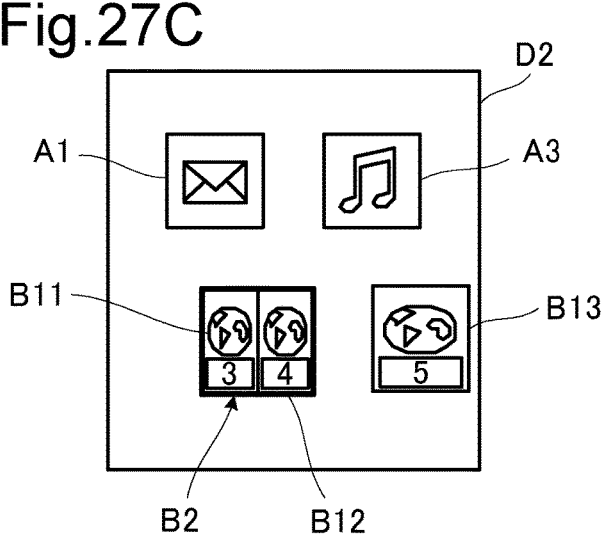

First, assume that, as shown in FIG. 27A, the functional icons B11, B12, B13 are displayed on the operation screen D2 of the display section 10. When in this state a slide gesture on the functional icon B11 is performed, the gesture acceptance section 102 accepts this slide gesture and the display control section 103 executes processing for moving the functional icon B11 in a direction of the slide gesture. Then, when the functional icon B11 is moved to a location adjacent to another functional icon B12 as shown in FIG. 27B, the display control section 103 subjects the functional icons B11 and B12 to lateral size reduction processing as shown in FIG. 27C and synthesizes the laterally reduced functional icons B11, B12 to create a synthetic icon B2. When a slide gesture on the functional icon B13 is also performed as shown in FIG. 27D, so that the functional icon B13 is moved to a location adjacent to the synthetic icon B2, the functional icon B13 is subjected to lateral size reduction processing as shown in FIG. 27E and the laterally reduced functional icon B13 is thus synthesized with the synthetic icon B2, so that a synthetic icon B1 is created. In this manner, the synthetic icon B1 synthesized from functional icons B11 to B13 is created.

Furthermore, in the seventh embodiment, by the control of the display control section 103 over the display section 10, the display size of each of the functional icon B11 to B13 in the synthetic icon B1 is changed while the synthetic icon B1 is maintained in a constant display size and a constant display region. Specifically, for each of the functional icons B11 to B13, the display time zone for the icon is set. The display control section 103 acquires a current time of day being timed on the display device 1, compares the current time of day with the display time zone for each of the functional icons B11 to B13 to select the icon for which the display time zone including the current time of day is set, and displays the selected icon in the maximum display size and the other icons in the minimum display size.

Figure 28:
FIG. 28 is a view conceptually showing a display time zone table in which functional icons are associated with respective display time zones in the display device according to the seventh embodiment.

FIG. 28 conceptually shows a display time zone table Dt5 in which the functional icons B11, B12, and B13 are associated with their respective display time zones. In this display time zone table Dt5, the functional icon B11 is set corresponding to a display time zone from AM 7:00 to AM 9:00, the functional icon B12 is set corresponding to a display time zone AM 9:00 to PM 5:00, and the functional icon B13 is set corresponding to a display time zone from PM 5:00 to AM 7:00.

In this case, in the display time zone from AM 7:00 to AM 9:00, as shown in FIG. 29A, the functional icon B11 in the synthetic icon B1 is laterally extended and thus displayed in the maximum display size and the other functional icons B12, B13 are laterally reduced and thus displayed in the minimum display size. In display time zone from AM 9:00 to PM 5:00, as shown in FIG. 29B, the functional icon B12 in the synthetic icon B1 is displayed in the maximum display size and the other functional icons B11, B13 are displayed in the minimum display size. In display time zone from PM 5:00 to AM 7:00, as shown in FIG. 29C, the functional icon B13 in the synthetic icon B1 is displayed in the maximum display size and the other functional icons B11, B12 are displayed in the minimum display size.

Therefore, when a touch gesture is performed near the center of the synthetic icon B1, the functional icon displayed in the maximum size is selected, the Internet browser function associated with this functional icon is executed, a site set by this Internet browser function is first accessed, and the first accessed site is displayed on the screen of the display section 10.

For example, in the display time zone from AM 7:00 to AM 9:00, the functional icon B11 is displayed in the maximum display size. Therefore, when a touch gesture is performed near the center of the synthetic icon B1, the functional icon B11 is selected, the Internet browser function associated with the functional icon B11 is executed, so that a site for weather forecast is first accessed and displayed. For another example, in the display time zone from AM 9:00 to PM 5:00, the functional icon B12 is displayed in the maximum display size. Therefore, when a touch gesture is performed near the center of the synthetic icon B1, the functional icon B12 is selected, so that a site frequently used for work is first accessed and displayed. Likewise, in the display time zone from PM 5:00 to AM 7:00, the functional icon B13 is displayed in the maximum display size. Therefore, when a touch gesture is performed near the center of the synthetic icon B1, the functional icon B13 is selected, so that a site for pleasure is first accessed and displayed. Therefore, by previously appropriately setting the display time zone table Dt5 shown in FIG. 28, the user can immediately browse a desired site according to the time zone.

In addition, since only the display sizes of the functional icons B11 to B13 in the synthetic icon B1 are changed and the functional icons B11 to B13 are kept displayed, a touch gesture can be performed on any one of the functional icons B11 to B13 regardless of the current time of day and, thus, the Internet browser function associated with each of the icons can be executed.

Not only the time of day but also the day of the week and/or the date may be set as the display time zone. Furthermore, the number of functional icons to be included in the synthetic icon B1 may be increased or decreased. Moreover, the function to be associated with each functional icon is not limited to an Internet browser function but a different function may be associated with the functional icon.

Figure 30:
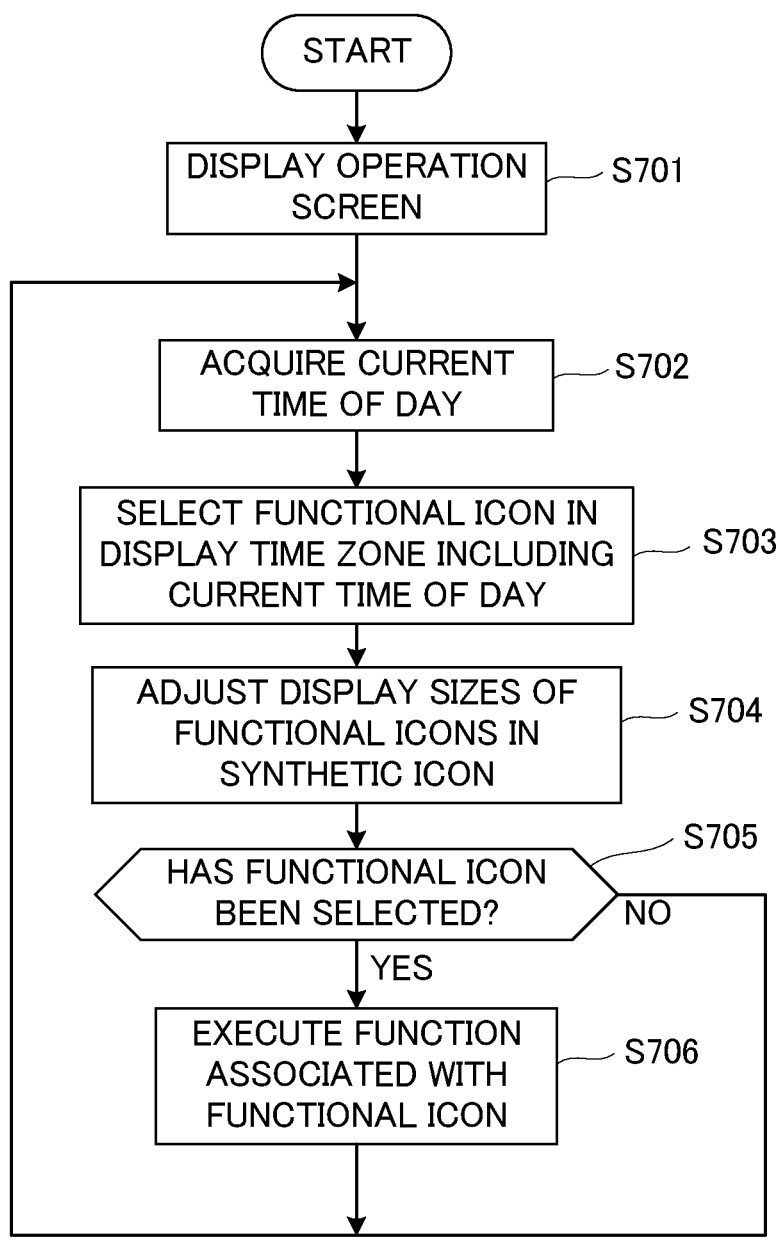
FIG. 30 is a flowchart showing processing for a display control of the display device according to the seventh embodiment.

Next, a description will be given of an operation of the display device 1 according to the seventh embodiment. FIG. 30 is a flowchart showing processing for changing the display sizes of functional icons in a synthetic icon on the display device 1.

The display control section 103 first reads data on an operation screen stored in the storage section 40 and allows the display section 10 to display the operation screen D1 (step S701). In doing so, the display control section 103 acquires a current time of day being timed on the display device 1 (step S702), compares the current time of day with the display time zone for each of the functional icons B11 to B13 in the display time zone table Dt5 to select the icon for which the display time zone including the current time of day is set (step S703), and displays this icon in the maximum display size and the other icons in the minimum display size (step S704).

Then, when, with the above operation screen D2 displayed on the display section 10, the gesture acceptance section 102 accepts a touch gesture on an icon placed on the operation screen D2 ("Yes" in step S705), the control section 101 executes the function associated with the icon on which the touch gesture has been performed (step S706). For example, when the gesture acceptance section 102 accepts a touch gesture for selecting one of the functional icons B11 to B13 included in the synthetic icon B1 on the operation screen D2, the control section 101 executes the Internet browser function associated with the selected functional icon. Thus, a site set by this Internet browser function is first accessed and the display control section 103 allows the display section 10 to display the first accessed site on the screen.

Thereafter, the processing of steps S702 to S706 is cyclically repeated, the icon for which the display time zone including the current time of day is set is displayed in the maximum display size, the other icons are displayed in the minimum display size, and, upon selection of one of the functional icons, the function associated with the selected functional icon is executed.

As thus far described, in the display device 1 according to the seventh embodiment of the present invention, one of the functional icons B11 to B13 in the synthetic icon B1 is displayed in the maximum display size according to the current time of day or the like. Therefore, the functional icon with the maximum display size can be easily selected, so that the usability for the user can be improved and a novel operability can be provided to the user.

Although in the seventh embodiment the functional icons B11 to B13 are subjected to lateral size reduction processing or size extension processing and laterally arranged to create a synthetic icon B1, the functional icons B11 to B13 may be subjected to vertical size reduction processing or size extension processing and vertically arranged to create a synthetic icon. Alternatively, it is possible to previously create small and large different-sized images for each of the functional icons B11 to B13, store them in the storage section 40, and combine small and large different functional icons to create a synthetic icon.

Hereinafter, a description will be given of other modifications. The description in the above embodiment has been given of the case where an image is selected according to the time of day from among a plurality of images indicating respective functions contained in the display device and the selected image is displayed in an icon placed on the display screen. Unlike this, in a display device 1 according to a modification, the display control section 103 selects, from among a plurality of images indicating respective functions contained in the display device, an image according to the time of day as well as the user who uses the display device 1.

In the display device 1 according to the modification, the display control program is executed by the CPU, so that the control unit 100 further functions as a user identifying section. When the gesture acceptance section 102 accepts a login operation on the display device 1, the user identifying section identifies the user having logged in by the login operation as a user using the display device 1. Furthermore, if the display device 1 includes a biometric sensor capable of biometric authentication, such as fingerprint authentication or face authentication, an ID card reader capable of reading an ID card storing an identification number for use in identifying a user, or the like, the user identifying section may use information output from the biometric sensor or the ID card reader to identify the user.

In the display device 1 according to the modification, a display time zone table as shown in FIG. 23 is stored for each user in the storage section 40. The display control section 103 selects the display time zone table for the user identified by the user identifying section and refers to the selected display time zone table to identify a functional icon appropriate to the current time of day. Then, the display control section 103 allows the display section 10 to display the identified functional icon.

A desired functional icon may be different not only from time-of-day to time-of-day but also from user to user. For example, some users want to browse a site for weather forecast in the morning time zone, but others want to browse a news site in the morning time zone. The display device 1 according to the modification can display a functional icon more appropriate to the user currently using the display device 1, so that the user convenience can be further improved.

Although in the above embodiments approximately square icons are illustrated as icons displayed on the operation screen, no particular limitation is placed on the shape of the icons and, for example, the icons may have an approximately circular shape.

The display control method described in each of the above embodiments can be provided as a program. This program is recorded on a non-transitory computer-readable recording medium, such as a hard disk, a CD-ROM, a DVD-ROM or a semiconductor memory. In this case, the non-transitory computer-readable recording medium with the program recorded thereon is one embodiment of the present invention.

The above embodiments and modifications may be combined variously.

The invention claimed is:

1. A display device comprising:
   a display section;
   a display control section that controls a display operation of the display section;
   a touch panel disposed on a screen of the display section;
   a gesture acceptance section that accepts a user's gesture through the touch panel; and
   a processing section that executes processing corresponding to the user's gesture accepted by the gesture acceptance section,
   wherein the display control section allows the display section to display on the screen an icon which is associated with a function contained in the display device and within which a plurality of regions are provided,
   wherein the gesture acceptance section determines, upon acceptance of the user's gesture on the icon, on which of the regions within the icon the user's gesture has been performed, and
   wherein when the gesture acceptance section accepts the user's gesture on the icon, the processing section executes processing related to the function associated with the icon, the processing corresponding to the region on which the user's gesture has been performed.

2. The display device according to claim 1,
   wherein the display control section allows a second functional image indicating a second function different from a first function to be displayed on the region within the icon, the first function being the function associated with the icon, and
   wherein when the gesture acceptance section accepts the user's gesture on the second functional image through the touch panel, the processing section executes the first function corresponding to the icon in association with the second function corresponding to the second functional image.

3. The display device according to claim 2,
   wherein the second function is a print function, and
   wherein when the gesture acceptance section accepts the user's gesture on the second functional image through the touch panel, the processing section allows an external image forming apparatus to print a file associated with the first function corresponding to the icon.

4. The display device according to claim 2,
   wherein a plurality of the second functional images representing the respective plurality of folders and/or files having a hierarchical structure are displayed within an image representing the icon, and
   wherein when the gesture acceptance section accepts the user's gesture on the second functional image, the display control section allows a second functional image representing a folder and/or a file contained in the folder corresponding to the second functional image to be displayed within the image representing the icon.

5. The display device according to claim 2,
   wherein a plurality of the second functional images are displayed within an image representing the icon, and
   wherein the gesture acceptance section detects, through the touch panel, a range of a touch on the icon during the user's gesture, selects, among the second functional images, the second functional image having a widest area overlapping with the range of the touch, and accepts the user's gesture on the selected second functional image.

6. The display device according to claim 2,
   wherein a plurality of the second functional images are displayed within an image representing the icon,
   wherein the gesture acceptance section accepts, through the touch panel, the user's gesture on two or more of the second functional images across which the user's gesture has been performed, and
   wherein the processing section executes the first function corresponding to the icon in association with the respective second functions corresponding to the two or more second functional images.

7. The display device according to claim 1,
wherein if the gesture acceptance section determines the user's gesture on a preset operating region, the processing section executes the function associated with the icon, and
wherein if the gesture acceptance section determines the user's gesture on a region other than the operating region, the processing section keeps from executing the function associated with the icon.

8. The display device according to claim 7, wherein if the gesture acceptance section determines the user's gesture on the region other than the operating region, the display control section allows the display section to display preset dummy data.

9. The display device according to claim 7, wherein the gesture acceptance section changes a location of the operating region within a display region of the icon according to a user having logged in to the display device.

10. The display device according to claim 7,
wherein the gesture acceptance section further determines whether the user's gesture on the operating region is a user's gesture performed in a preset operation procedure or a user's gesture performed differently from the preset operation procedure, and
wherein if the gesture acceptance section determines that the user's gesture is a user's gesture on the operating region and a user's gesture performed in the preset operation procedure, the processing section executes the function associated with the icon.

11. The display device according to claim 1,
wherein the display control section (i) selects, according to a time of day, an image from among a plurality of images indicating respective functions contained in the display device and (ii) allows the selected image to be displayed in the region within the icon placed on the display screen, and
wherein when the gesture acceptance section accepts the user's gesture on the icon, the processing section executes the function corresponding to the image selected by the display control section.

12. The display device according to claim 11,
wherein the display control section (i) allows a synthetic image composed of the plurality of images indicating the respective functions contained in the display device to be displayed within the icon placed on the display screen and (ii) changes a display size of each of the images forming the synthetic image according to the time of day, and
wherein when the gesture acceptance section accepts the user's gesture on the icon, the processing section executes the function corresponding to, among the plurality of images forming the synthetic image, the image on which the user's gesture has been performed.

13. The display device according to claim 12, wherein the display control section selects, according to the time of day, one image from among the plurality of images indicating the respective functions contained in the display device and makes the display size of the selected one image larger than the display size of the other images in the synthetic image.

14. The display device according to claim 11,
further comprising a user identifying section that identifies a user operating the display device,
wherein the display control section selects, from among the plurality of images indicating the respective functions contained in the display device, an image according to the time of day as well as the user identified by the user identifying section.

* * * * *